United States Patent
Kaido et al.

(10) Patent No.: US 8,655,376 B2
(45) Date of Patent: Feb. 18, 2014

(54) METHODS AND APPARATUS FOR TRANSMITTING POSITION INFORMATION AMONG USER TERMINALS

(75) Inventors: Kenji Kaido, Kanagawa (JP); Eiichi Nishina, Tokyo (JP); Tomohiro Hasekura, Tokyo (JP); Shohei Konno, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/398,974

(22) Filed: Feb. 17, 2012

(65) Prior Publication Data

US 2012/0214505 A1   Aug. 23, 2012

(30) Foreign Application Priority Data

Feb. 22, 2011   (JP) .................................. 2011-035403

(51) Int. Cl.
*H04W 24/00* (2009.01)
(52) U.S. Cl.
USPC .................. 455/456.1; 455/456.3; 455/456.4; 455/456.5; 455/456.6; 455/457

(58) Field of Classification Search
None
See application file for complete search history.

(56) References Cited

U.S. PATENT DOCUMENTS

| | | | |
|---|---|---|---|
| 6,618,593 B1 * | 9/2003 | Drutman et al. | 455/456.3 |
| 8,191,151 B2 | 5/2012 | Yano | |
| 8,251,823 B2 | 8/2012 | Kando | |
| 2003/0084119 A1 * | 5/2003 | Ichimura | 709/217 |
| 2003/0236095 A1 * | 12/2003 | Ross | 455/456.1 |
| 2006/0246920 A1 * | 11/2006 | Shim | 455/456.2 |
| 2008/0139310 A1 | 6/2008 | Kando | |
| 2009/0007278 A1 | 1/2009 | Yano | |
| 2010/0293255 A1 | 11/2010 | Hara | |
| 2010/0323716 A1 | 12/2010 | Jaffri | |
| 2011/0043658 A1 | 2/2011 | Sasai | |

FOREIGN PATENT DOCUMENTS

| | | |
|---|---|---|
| EP | 1309212 A2 | 5/2003 |
| JP | 2008-058267 A | 3/2008 |
| JP | 2008-142181 A | 6/2008 |
| JP | 2009-009305 A | 1/2009 |
| JP | 2009-268007 A | 11/2009 |

(Continued)

OTHER PUBLICATIONS

Office Action for corresponding JP Patent Application No. No. 2011-035403, dated Jan. 29, 2013.

(Continued)

*Primary Examiner* — Suhail Khan
(74) *Attorney, Agent, or Firm* — Matthew B. Dernier, Esq.; Gibson & Dernier LLP

(57) ABSTRACT

A position coordinate receiving section obtains a position from a user terminal. A nearby user distributing section provides information about a source user terminal to a recipient user terminal. The nearby user distributing section controls whether or not to provide the information about the source user terminal to the recipient user terminal based on a position that is obtained from the recipient user terminal and a position obtained from the source user terminal. The position obtained from the source user terminal that is used in the control is a position outside an area set by a user of the source user terminal. Accordingly, a user is provided a way to prevent other users from knowing that the user is in a place specified by the user.

5 Claims, 17 Drawing Sheets

(56) References Cited

FOREIGN PATENT DOCUMENTS

| WO | 0221864 A1 | 3/2002 |
| WO | 2009096015 A1 | 8/2009 |
| WO | 2010148210 A2 | 12/2010 |

OTHER PUBLICATIONS

European Search Report for corresponding European Patent Application No. No. 12156243.3-1905, dated Jul. 2, 2013.

* cited by examiner

FIG.21

| POSITION COORDINATES | DATE/TIME |
|---|---|
| $(X_{01}, Y_{01})$ | 2010/6/30  12:00 |
| $(X_{02}, Y_{02})$ | 2010/6/30  12:30 |
| $(X_{03}, Y_{03})$ | 2010/6/30  13:00 |
| $(X_{04}, Y_{04})$ | 2010/6/30  14:00 |
| $(X_{05}, Y_{05})$ | 2010/6/30  14:30 |

FIG.22

| TITLE ID | LEVEL | PLAY TIME | LAST PLAY DATE/TIME |
|---|---|---|---|
| T001 | 1 | 18h | 2010/6/25  13:15 |
| T003 | 4 | 110h | 2010/6/25  15:45 |
| T024 | 2 | 52h | 2010/7/1  9:23 |
| T013 | 3 | 61h | 2010/7/2  19:34 |
| T002 | 1 | 3h | 2010/6/23  13:08 |

FIG.25

| AREA ID | TIME SLOT | GAME PERFORMANCE DATA 1 ||| GAME PERFORMANCE DATA 2 |||
|---|---|---|---|---|---|---|---|
| | | TITLE ID | LEVEL | PLAY TIME | TITLE ID | LEVEL | PLAY TIME |
| 010010···· | 2010/6/10 12:00~18:00 | T001 | 3 | 102h | T011 | 2 | 80h |
| 010010···· | 2010/6/10 18:00~24:00 | T002 | 2 | 84h | T007 | 4 | 135h |

FIG.26

AREA ID : 010010·····

| USER ID | POSITION COORDINATES | DATE/TIME |
|---|---|---|
| U001 | $(X_1, Y_1)$ | 2010/6/8 13:24 |
| U013 | $(X_2, Y_2)$ | 2010/6/8 13:25 |

FIG.27

| USER ID | LATEST POSITION COORDINATES | DATE/TIME | GAME PERFORMANCE DATA 1 ||| GAME PERFORMANCE DATA 2 |||
|---|---|---|---|---|---|---|---|---|
| | | | TITLE ID | LEVEL | PLAY TIME | TITLE ID | LEVEL | PLAY TIME |
| U001 | $(X_n, Y_n)$ | 2010/6/12 12:10 | T001 | 1 | 18h | T003 | 4 | 110h |
| U002 | $(X_m, Y_m)$ | 2010/6/12 12:00 | T100 | 1 | 25h | T008 | 2 | 54h |

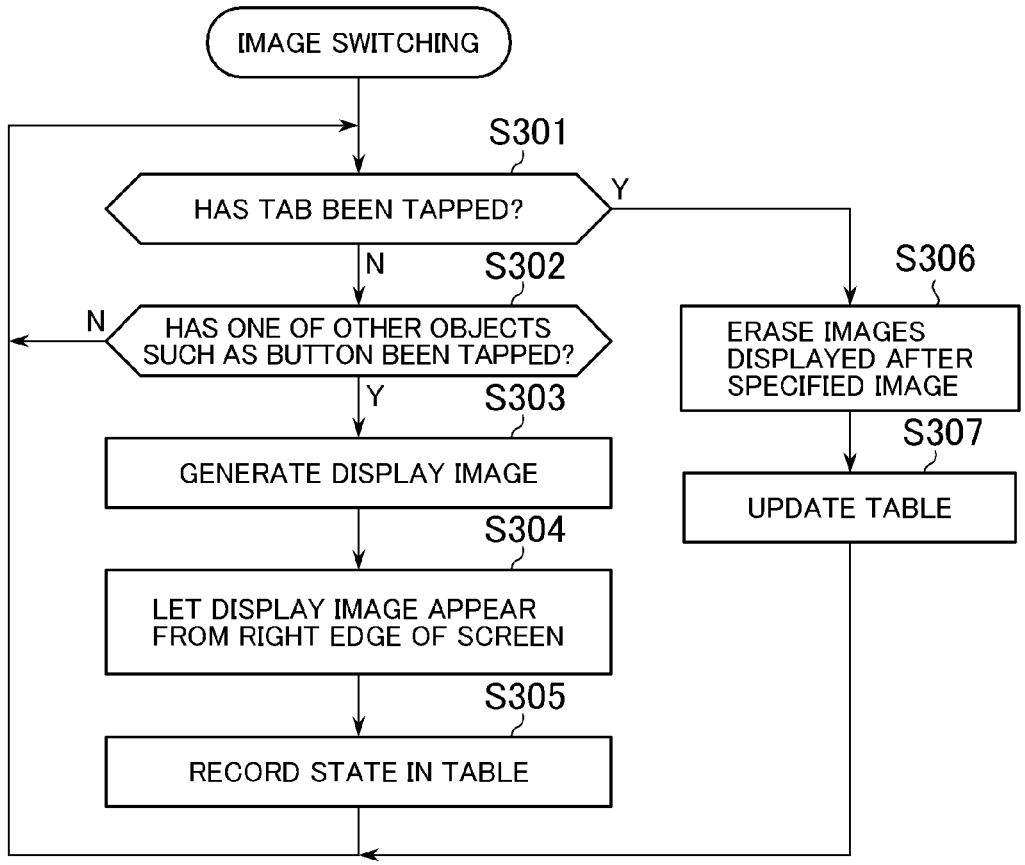

METHODS AND APPARATUS FOR TRANSMITTING POSITION INFORMATION AMONG USER TERMINALS

CROSS-REFERENCE TO RELATED APPLICATIONS

The present application claims priority from Japanese application JP 2011-035403 filed on Feb. 22, 2011, the content of which is hereby incorporated by reference into this application.

BACKGROUND OF THE INVENTION

1. Field of the Invention

The present invention relates to a communication system, a communication method, a program, and an information storage medium.

2. Description of the Related Art

There have been known game systems in which game terminals communicate with each other by radio over a relatively short distance to directly exchange game data. With a game system of this type, the direct exchange of game data between game terminals sometimes happens accidentally when the users of the game terminals are just passing each other, and strangers can thus exchange game data with each other without efforts. This also allows a user to be aware of the presence of other uses living in the same area.

SUMMARY OF THE INVENTION

Regardless of whether a user intends to use the short-distance wireless communication or not, the user benefits from improved convenience by being made aware through communication between game terminals of the presence of other users living in the same area. However, some users may not wish to let other users know of their presence in a particular place. This applies not only to communication between game terminals but also to general communication between information processing terminals.

The present invention has been made in view of the problem described above, and an object of the present invention is therefore to provide a user a way to prevent other users from knowing that the user is in a place specified by the user.

In order to solve the above-mentioned problem, according to the present invention, there is provided a communication system, including: a position obtaining unit that obtains a position from a user terminal; and an information providing unit that provides information about a source user terminal which is an information source to a recipient user terminal which receives information, in which the information providing unit controls whether or not to provide the information about the source user terminal to the recipient user terminal based on a position that is obtained from the recipient user terminal and a position obtained from the source user terminal, and the position obtained from the source user terminal that is used in the control is a position outside an area set by a user of the source user terminal.

According to the present invention, there is also provided a communication method, including: obtaining a position from a user terminal; and providing information about a source user terminal which is an information source to a recipient user terminal which receives information, in which the providing of the information includes controlling whether or not to provide the information about the source user terminal to the recipient user terminal based on a position that is obtained from the recipient user terminal and a position obtained from the source user terminal, and the position obtained from the source user terminal that is used in the control is a position outside an area set by a user of the source user terminal.

According to the present invention, there is also provided a program stored on a non-transitory computer-readable information storage medium having instructions for execution by a computer, the program having instructions for: obtaining a position from a user terminal; and providing information about a source user terminal which is an information source to a recipient user terminal which receives information, wherein the providing of the information includes controlling whether or not to provide the information about the source user terminal to the recipient user terminal based on a position that is obtained from the recipient user terminal and a position obtained from the source user terminal, and wherein the position obtained from the source user terminal that is used in the control is a position outside an area set by a user of the source user terminal.

According to the present invention, there is also provided a non-transitory computer-readable information storage medium having a program executed by a computer stored thereon, the program having instructions for: obtaining a position from a user terminal; and providing information about a source user terminal which is an information source to a recipient user terminal which receives information, wherein the providing of the information includes controlling whether or not to provide the information about the source user terminal to the recipient user terminal based on a position that is obtained from the recipient user terminal and a position obtained from the source user terminal, and wherein the position obtained from the source user terminal that is used in the control is a position outside an area set by a user of the source user terminal.

According to the present invention, a position within an area set by the user of the source user terminal is not used in control as to whether or not to provide information on the source user terminal to the recipient user terminal, and a user can thus prevent other users from knowing that the user is in a place specified by the user.

Further, according to an aspect of the present invention, the position obtaining unit does not obtain, from the source user terminal, as a position used in the control, a position inside the area set by the user of the source user terminal.

Further, according to an aspect of the present invention, the position obtaining unit does not obtain, from the source user terminal, as a position used in the control, a position within a given distance from a position that is set by the user of the source user terminal.

Further, according to an aspect of the present invention, the communication system includes the source user terminal, the source user terminal includes a transmission unit that transmits a position to a server which provides information to the recipient user terminal, and the transmission unit does not transmit, to the server, as a position used in the control, a position inside the area set by the source user terminal.

Further, according to an aspect of the present invention, the source user terminal further includes a positioning unit that sequentially calculates positions of the source user terminal and sequentially storing the calculated positions in a position storing unit, and the transmission unit transmits, to the server, as positions used in the control, at least some of calculation results that are among a plurality of calculation results stored in the position storing unit and that indicate positions outside the area set by the user of the source user terminal.

BRIEF DESCRIPTION OF THE DRAWINGS

In the accompanying drawings:

FIG. 21 is a diagram schematically illustrating data in a position coordinate storing section;

FIG. 22 is a diagram schematically illustrating data in a game performance data storing portion;

FIG. 23 is a flow chart illustrating processing of transmitting position coordinates and the like;

FIG. 25 is a diagram schematically illustrating data in an area-based title ID storing unit;

FIG. 26 is a diagram schematically illustrating data in an area-based user ID storing sectionarea-based user ID storing section;

FIG. 27 is a diagram schematically illustrating data in a user information storing sectionuser information storing section;

FIG. 29 is a flow chart illustrating image switching processing; and

FIG. 30 is a diagram illustrating an example of a display image management table.

DETAILED DESCRIPTION OF THE INVENTION

An embodiment of the present invention is described in detail below with reference to the drawings.

Figure 1:
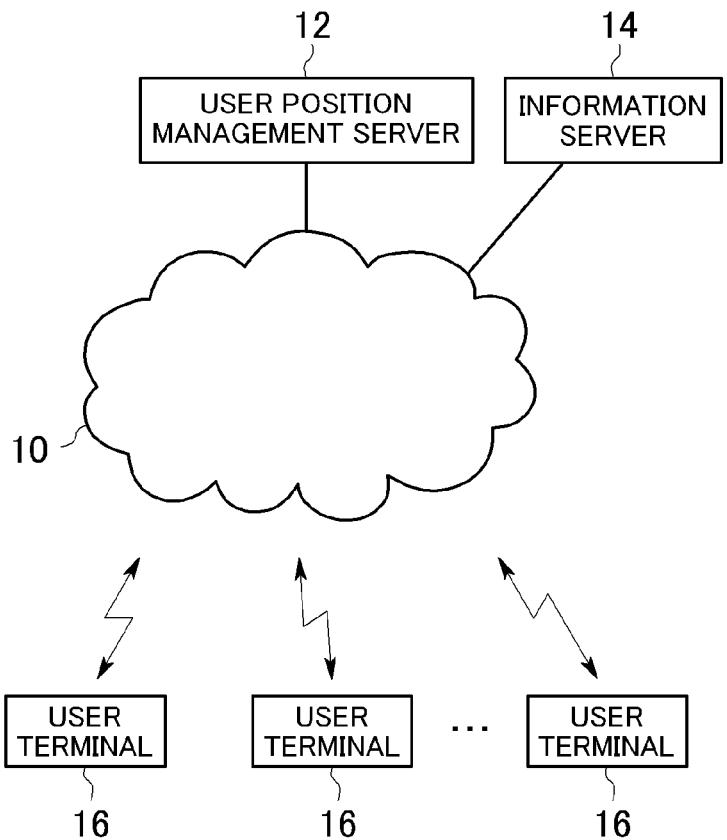
FIG. 1 is an overall configuration diagram of a communication system according to an embodiment of the present invention.
Figure 2:
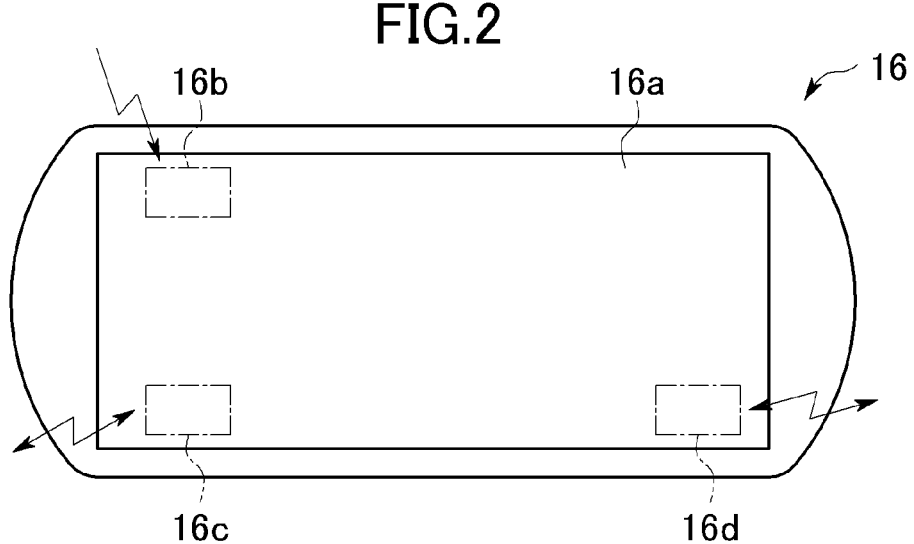
FIG. 2 is a diagram illustrating the external appearance of a user terminal.

FIG. 1 is an overall configuration diagram of a communication system according to the embodiment of this invention. As illustrated in FIG. 1, the communication system includes a user position management server 12, an information server 14, and a plurality of user terminals (information processing devices) 16 which are connected to a computer communication network 10 such as the Internet. The user position management server 12 and the information server 14 are constituted mainly of known server computers, for example. Each user terminal 16 is a portable computer game system driven on a battery, and has a touch screen 16a on the front as illustrated in an exterior view of FIG. 2. The user terminal 16 also has, as built-in components, a positioning unit 16b, which uses Global Positioning System (GPS) to calculate the position (the latitude and longitude) of the user terminal 16, a cellular phone communication unit 16c, which communicates data over a cellular phone network, and a wireless LAN communication unit 16d, which communicates data over a wireless LAN. The user terminal 16 selectively uses one of the cellular phone communication unit 16c and the wireless LAN communication unit 16d that is suitable for the communication environment to connect to the computer communication network 10, and communicates data with the user position management information server 12 and the information server 14.

The user terminal 16 repeatedly calculates its own position with the use of satellite signals and holds the results of the positioning. The user terminal 16 may use other positioning methods as described later. The user terminal 16 also holds data that indicates game program execution performance. The positioning results and the game execution performance data are uploaded to the user position management server 12 manually when the user operates the user terminal 16 to do so, or automatically at regular time intervals. The user position management server 12 holds positioning results and execution performance data that are uploaded from many user terminals 16 in this manner. Each user terminal 16 displays on the touch screen 16a an image that indicates the travel route of the user terminal 16 (see FIG. 5) based on the information held on the user position management server 12 and the positioning results held by itself.

Figure 3:
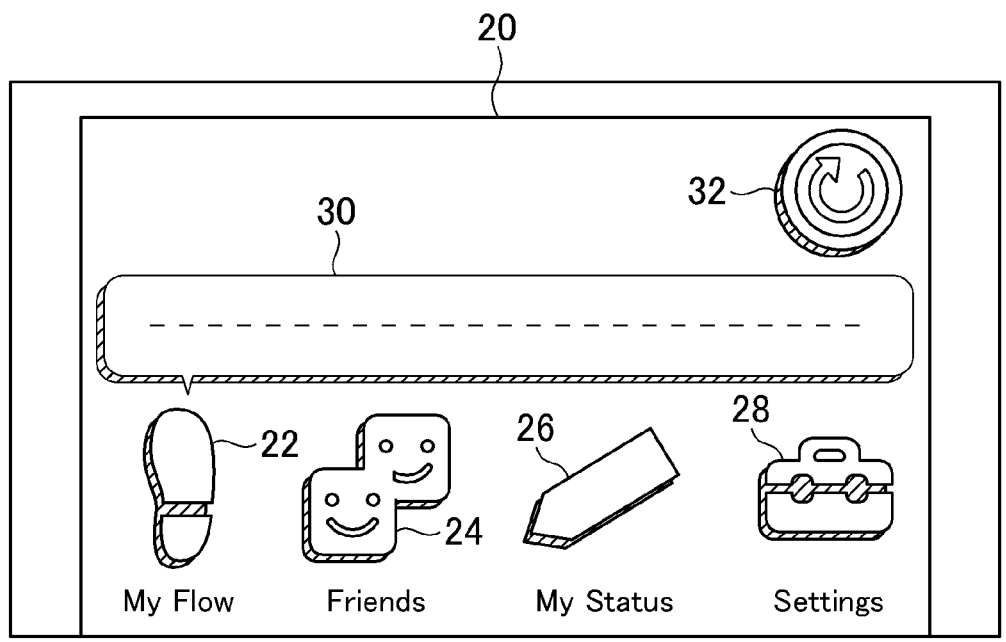
FIG. 3 is a diagram illustrating an example of a main menu image.

FIG. 3 illustrates an example of a main menu image displayed on the touch screen 16a of the user terminal 16. The main menu image is the first image that is displayed after the user terminal 16 is activated and an application program of this embodiment is executed. The main menu image displays a base 20, which represents a base sheet, buttons 22, 24, 26, 28, and 32, which are placed on the base 20, and a message 30. The buttons 22, 24, 26, 28, and 32 and the message 30 are placed in a virtual three-dimensional space with a gap between the base 20 and the buttons and the message. The main menu image shows these objects viewed from a camera that is placed virtually in the same virtual three-dimensional space. This image is generated with the use of a known three-dimensional computer graphics technology. The buttons 22, 24, 26, 28, and 32 and the message 30 at this point are hatched, so that the user can immediately understand that the buttons and the message are floating above the base 20 (on the side of the virtual camera). In this embodiment, objects floating above the base 20 are objects that the user can operate as buttons by tapping the touch screen 16a. After the main menu image is displayed, the application program (a display control sectiondisplay control section 70) keeps determining at regular time intervals whether or not programs associated with the buttons 22, 24, 26, 28, and 32 and the message 30 can be executed. When the application program determines that the associated programs are executable, the objects are placed at a given distance ("execution distance") from the base 20 as illustrated in FIG. 3. An object is placed close to the base 20 in the manner the button 26 is displayed in FIG. 4 until its associated program is determined as executable. Specifically, the buttons 22, 24, 26, 28, and 32 and the message 30 are placed close to or at a distance shorter than the execution distance ("non-execution distance") from the base 20 when their associated programs are not executable.

The button 22 is for displaying the travel route image which has been described above. The button 24 is for displaying a friend image which is described later. The button 26 is for displaying a status image. The button 28 is for displaying a settings image. The message 30 displays information associated with the buttons 22, 24, 26, and 28. Tapping the area of the message 30 displays details of the message 30. The button 32 is for uploading to the user position management server 12 the positioning results and game execution performance data described above. The button 32 is placed at the execution distance from the sheet 20 when the positioning results and the performance data are ready to be uploaded, and until then, is placed close to or at the non-execution distance from the base 20. Whether or not the positioning results and the performance data are ready to be uploaded are determined by whether or not data communication over the cellular phone communication unit 16c or the wireless LAN unit 16d is possible and whether or not there is data to be uploaded.

Figure 4:
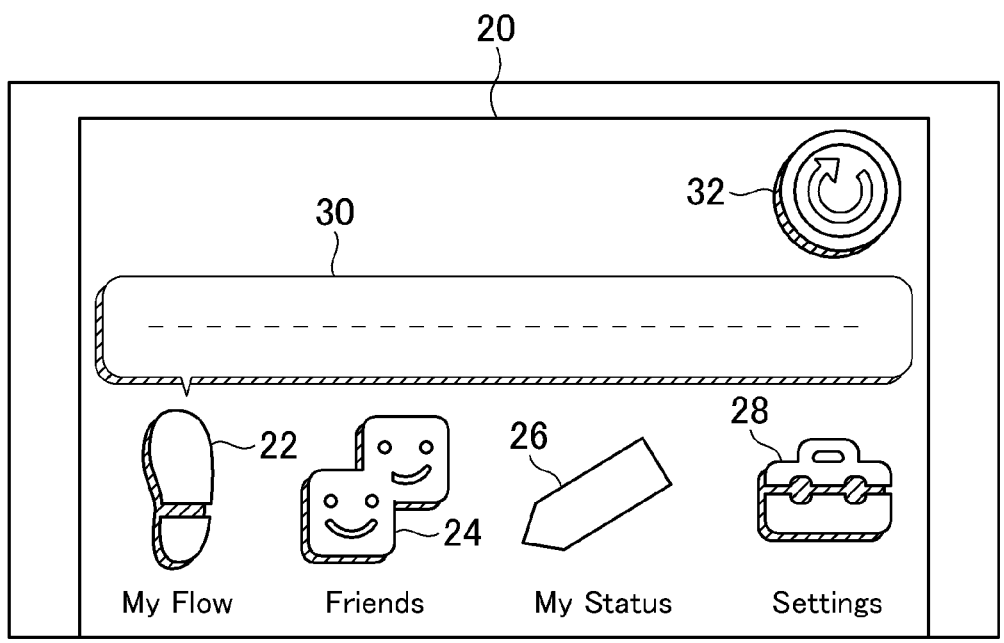
FIG. 4 is a diagram illustrating the example of the main menu image.
Figure 5:
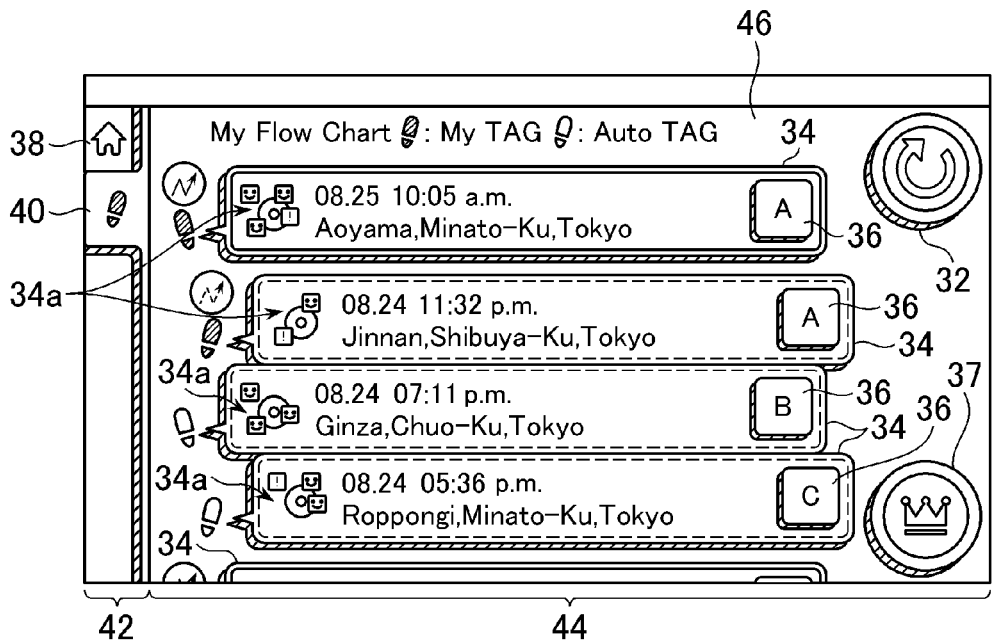
FIG. 5 is a diagram illustrating an example of a travel route image.

FIG. 5 illustrates an example of the travel route image. The travel route image is displayed when the button 22 contained in the main menu image of FIG. 4 is tapped. The whole travel route image actually has a shape that is longer in height than in width, and only a part of the travel route image which is set to a display range is displayed on the touch screen 16a. The user can move the display range by making a given operation such as a flick on the touch screen 16a, thereby causing the touch screen 16a to display any part of the whole travel route image.

The user terminal 16 repeatedly calculates its own position and holds the calculated positions. The travel route image displays record frames 34, each of which contains an address letter string indicating a held position and a calculating date/time, in the order that the positions have been calculated. Specifically, newer calculation results are displayed at the top. These record frames 34 are floated above a base 46 and can be tapped. While the record frames 34 each containing an address letter string and a calculating date/time are employed here as information indicating a calculated position, the information indicating a calculated position may be a record frame 34 that contains only an address letter string or may be an address letter string alone. The address letter string may be a full address including a street address, or may only be an administrative district name such as a state name, a province name, a city name, a town name, or a village name. The information indicating a calculated position may also be an icon that is a design representing the position. The position information is obtained by converting a calculated position as described later.

Although the positioning unit 16b repeatedly calculates the position of its own user terminal 16, the user terminal 16 keeps a record of a newly calculated position only when the newly calculated position is at a given distance (for example, 2 km) or more from the latest position that has been held in the user terminal 16. The user terminal 16 does not keep a record of a newly calculated position when the distance between the newly calculated position and the latest held position is shorter than the given distance. The user terminal 16 always holds only a given number of (twenty, for example) positioning results and, out of the held positioning results, selects some that are useful in displaying the travel route of the user terminal 16. For instance, the user terminal 16 calculates for each positioning result an evaluation value which is an increasing function of the length of time elapsed from the last positioning time and the distance from a position obtained in the last positioning, and selects a given number of (ten, for example) highly evaluated positioning results to include only the record frames 34 that correspond to the selected positioning results in the travel route image. This way, the travel route image displays only significant travels and therefore is easy to comprehend. In addition, because displaying insignificant information is prevented, the touch screen 16a can be used efficiently.

A situation image 34a is displayed at the left of each record frame 34. The situation image 34a indicates the number of other user terminals 16 that have uploaded the same position to the user position management server 12, whether or not the user terminals 16 of friend users have obtained by positioning and uploaded to the user position management server 12 the position that the user terminal 16 in question has obtained by positioning and uploaded to the user position management server 12, and the like. This enables the user to grasp at a glance how many other users carrying the user terminals 16 have been at each position and how many of the other users who have been at the position are friends of the user. A title 36 of a featured game program is also displayed in each record frame 34. A button 37 is also placed in the lower right corner of the travel route image. The button 37 is for displaying on the touch screen 16a a ranking image, which is described later.

A white or black footprint image is displayed to the left of each record frame 34. A white footprint image indicates that its associated record frame 34 shows one of positioning results automatically calculated at regular time intervals. A black footprint image indicates that its associated record frame 34 shows the result of positioning that has been executed manually by the user's operation. The record frame 34 that is a solid-line frame shows a positioning result and the like that have been uploaded manually by the user's operation. The record frame 34 that is a dashed-line frame shows a positioning result and the like that have been uploaded automatically at regular time intervals.

As illustrated in FIG. 5, a vertically oblong area along the left edge of the touch screen 16a is a tab area 42 in which tab images 38 and 40 are displayed. The tab images 38 and 40 are arranged in the order that the tabs' associated images have been displayed, starting from the top of the screen. A main area 44 is to the right of the tab area 42. The travel route image is placed in the main area 44 here. In the tab area 42 which displays the plurality of tab images 38 and 40, the tab image 38 associated with the main menu image is placed at the top, and the tab image 40 associated with an image that is currently displayed in the main area 44 is placed at the bottom. The tab images 38 and 40 each have an icon that indicates which image is associated with the tab image.

Figure 6:
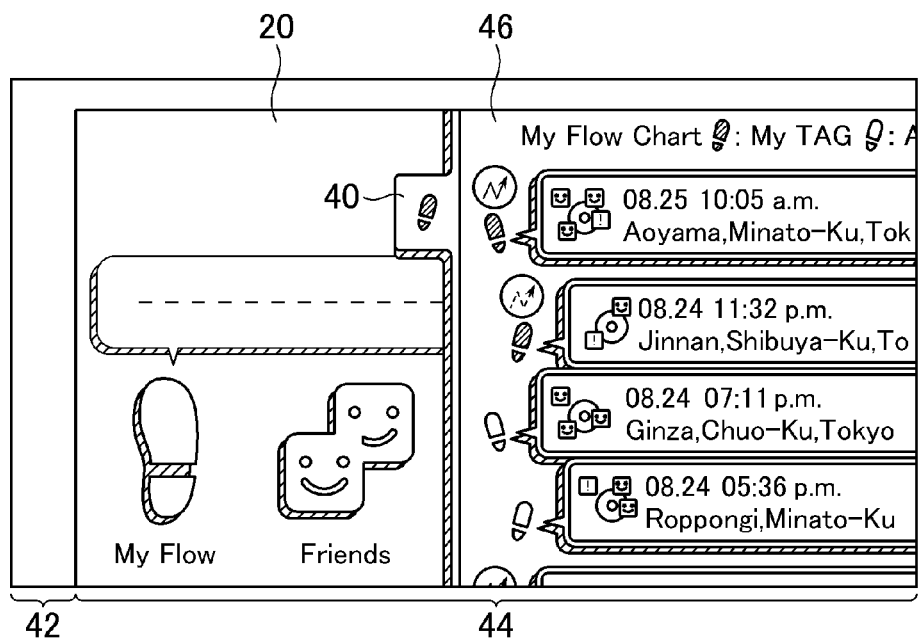
FIG. 6 is a diagram illustrating a switch from the main menu image to the travel route image.

When the button 22 in the main menu image of FIG. 3 is touched, the travel route image and the tab image 40, which is associated with the travel route image, appear from the right edge of the touch screen 16a as illustrated in FIG. 6. The travel route image and the tab image 40 slide leftward until the travel route image covers the main menu image. Accordingly, in the main area 44, the travel route image is displayed instead of the main menu image. The tab image 40 enters the tab area 42. Other images described later appear on the touch screen 16a in the same manner. The tab image 38 which is associated with the main menu image appears on the topmost part of the tab area 42 when one of the other images than the main menu image is displayed in the main area 44.

Figure 7:
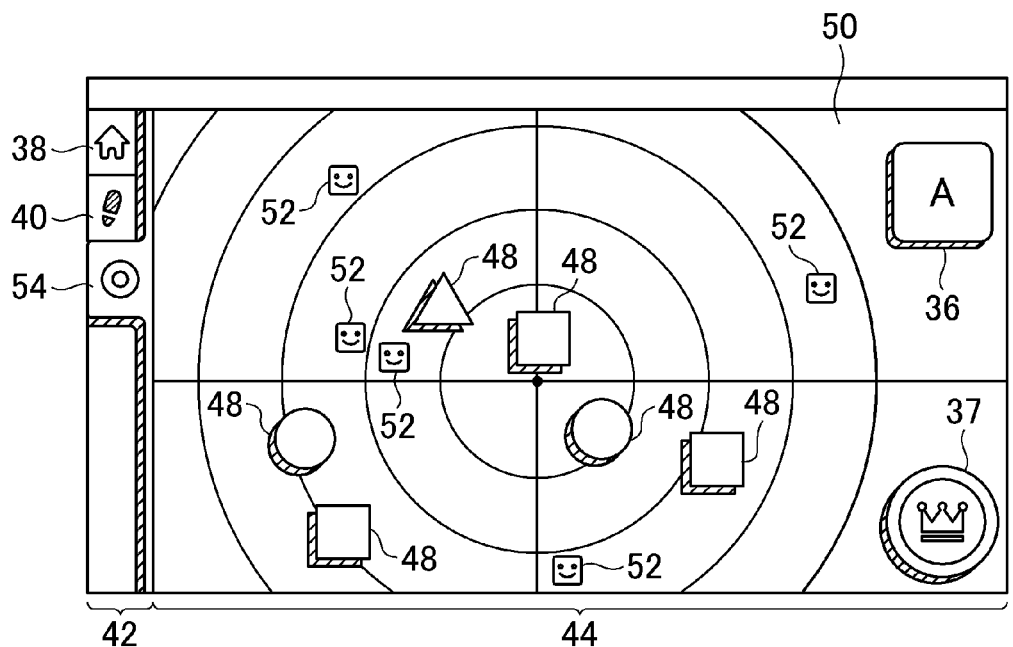
FIG. 7 is a diagram illustrating an example of a radar image.

FIG. 7 illustrates a radar image which is displayed on the touch screen 16a when one of the record frames 34 is tapped in the travel route image of FIG. 5. The radar image, as does the travel route image, appears from the right edge of the touch screen 16a along with a tab image 54. A black circle which represents the user in question is displayed at the center of the radar image and avatar images 48 of other users whose privacy settings are set to "public" are displayed around the black circle. The avatar images 48 are floated above a base 50 and can be tapped. The radar image also displays small images 52 which suggest the presence of other users whose privacy settings are set to "private." The display position of each avatar image on the touch screen 16a is determined based on a position actually calculated by the positioning unit 16b. In other words, based on a position calculated by the positioning unit 16b and uploaded to the user position management server 12, the user terminal 16 calculates the positions of other "public" users relative to its own position and, from the calculated relative positions, determines the display positions of the avatar images 48 on the touch screen 16a. The display positions of the small images 52 on the touch screen 16a, on the other hand, are determined by random numbers.

Figure 8:
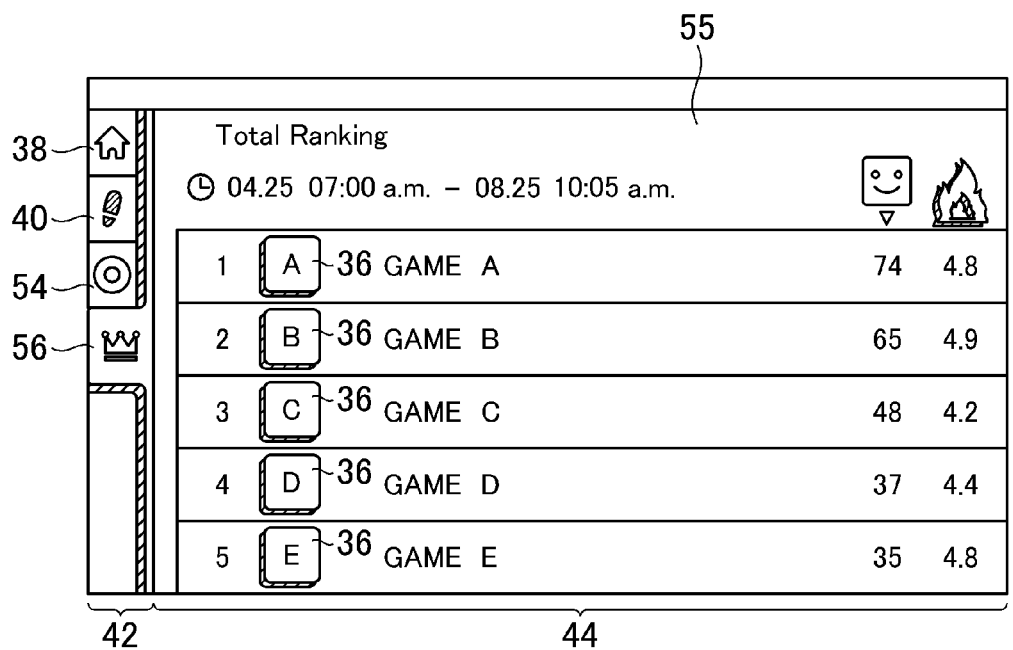
FIG. 8 is a diagram illustrating an example of a ranking image.

FIG. 8 illustrates a ranking image which is displayed on the touch screen 16a when the user taps the button 37 in the radar image of FIG. 7. The ranking image is displayed also when the button 37 contained in the travel route image of FIG. 5 is tapped. Elements of the ranking image are placed on a base 55. As illustrated in FIG. 8, the ranking image displays the titles of game programs that have been played on the user terminals 16 from which the same position as the user position of the user terminal 16 in question have been uploaded to the user position management server 12. The game titles are displayed in descending order of the number of the user terminals 16 on which the game programs having those titles have been played. Displayed to the right of each title is the number of user terminals 16 on which the game program having the tile has been played. The ranking image, too, on the whole has a shape that is longer in height than in width, and only a part of the ranking image which is set to a display range is displayed on the touch screen 16a. The user can move the display range by making a given operation such as a flick on the touch screen 16a.

Figure 9:
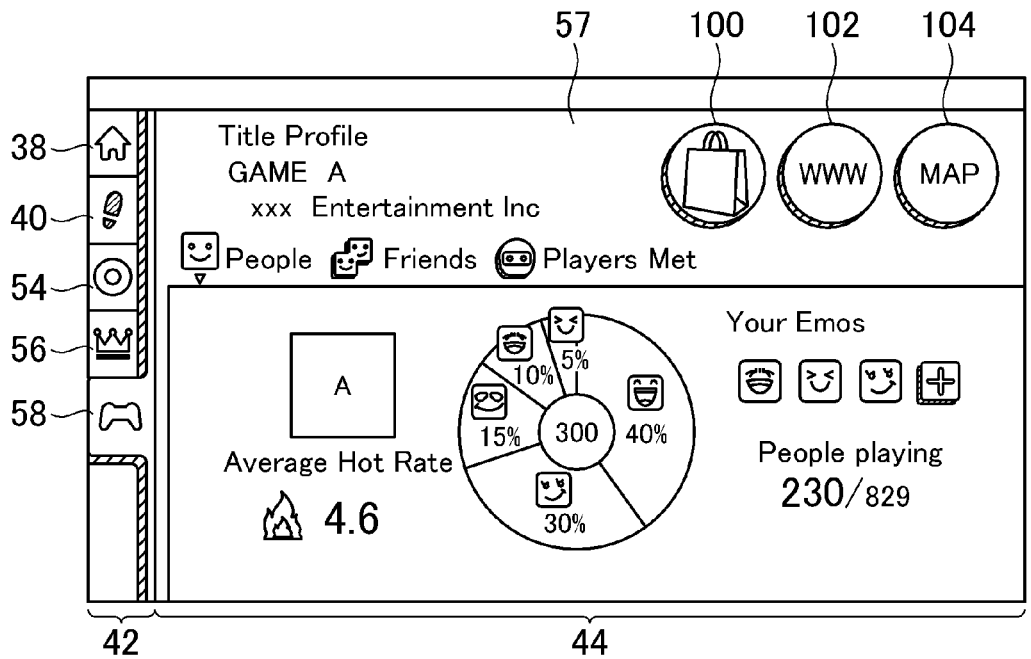
FIG. 9 is a diagram illustrating an example of a title profile image.

FIG. 9 illustrates a title profile image which is displayed on the touch screen 16a when the title 36 of one of game programs is tapped in the ranking image of FIG. 8. The title profile image is displayed also when one of the titles 36 is tapped in the travel route image of FIG. 5 or the radar image of FIG. 7. The title profile image contains an information field which shows evaluations given by other users on the game program having the tapped title 36, and other users' play status of the game program. Information in the information field is received from, for example, the information server 14. The title profile image contains buttons 100, 102, and 104 placed on a base 57. When the button 100 is tapped, a web browser is activated and a web page of an electronic commerce site where the game title can be purchased is displayed on the touch screen 16a. When the button 102 is tapped, a web browser is activated to access a search site with the game title as a search word, and a list of sites that distribute information about the game title is displayed on the touch screen 16a. When the button 104 is tapped, a web browser is activated to access a map site, and a map pointing out the position of a shop that sells software of the game title is displayed on the touch screen 16a. The title profile image, too, has a shape that is longer in height than in width, and only a part of the ranking image which is set to a display range is displayed on the touch screen 16a. The user can move the display range by making a given operation such as a flick on the touch screen 16a.

Figure 10:
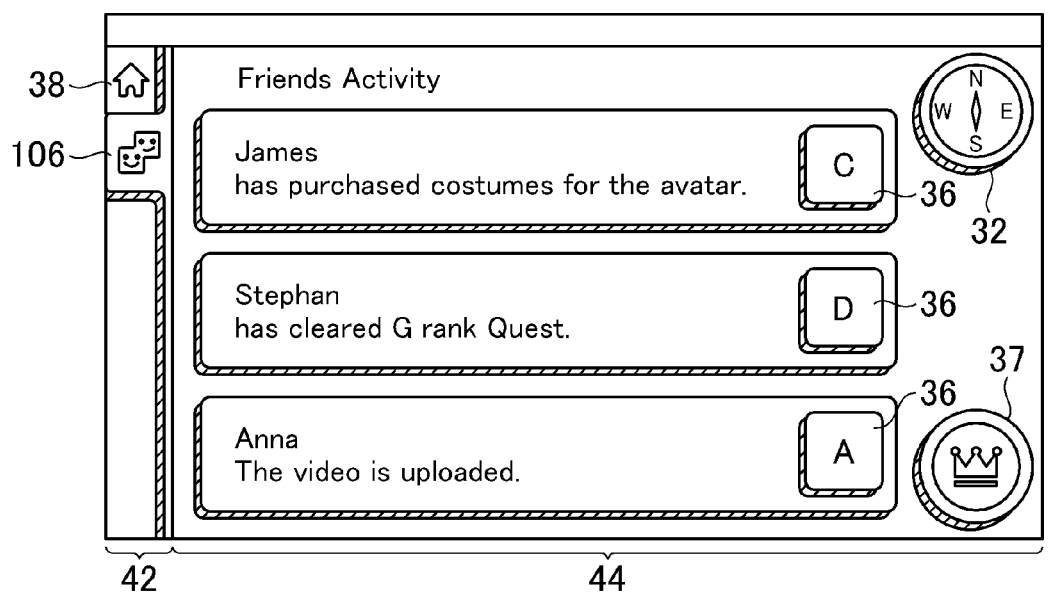
FIG. 10 is a diagram illustrating an example of a friend image.

FIG. 10 illustrates a friend image which is displayed on the touch screen 16a when the button 24 is tapped in the main menu image of FIG. 3. As illustrated in FIG. 10, the friend image displays latest information about each friend. The latest information is received from, for example, the information server 14. The friend image, too, has a shape that is longer in height than in width, and only a part of the ranking image which is set to a display range is displayed on the touch screen 16a. The user can move the display range by making a given operation such as a flick on the touch screen 16a. The friend image also has a tab image 106 attached thereto.

Figure 11:
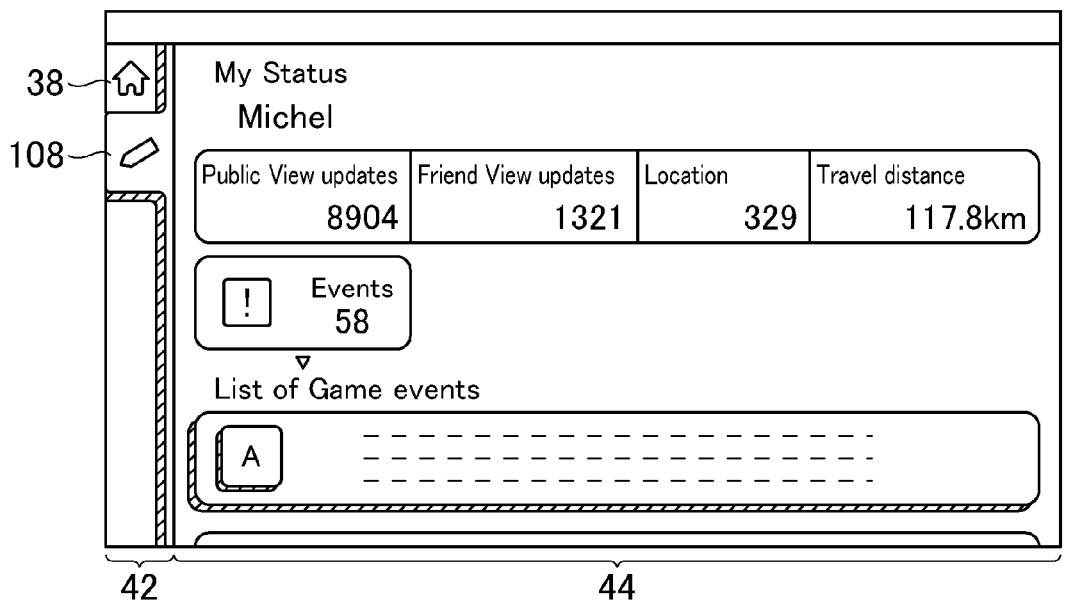
FIG. 11 is a diagram illustrating an example of a status image.

FIG. 11 illustrates a status image which is displayed on the touch screen 16a when the button 26 is tapped in the main menu image of FIG. 3. The status image shows information such as the number of positions uploaded to the user position management server 12 and the total travel distance. The information in the status image is received from the information server 14 or calculated on the user terminal 16. The status image also has a tab image 108 attached thereto.

Figure 12:
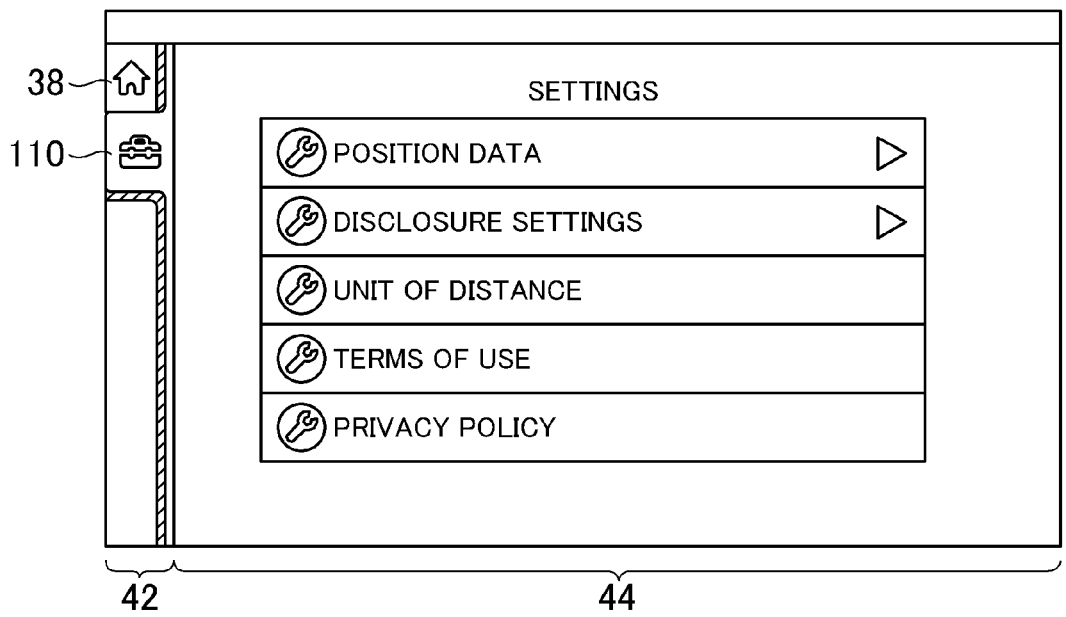
FIG. 12 is a diagram illustrating an example of a settings image.

FIG. 12 illustrates a settings image which is displayed on the touch screen 16a when the button 28 is tapped in the main menu image of FIG. 3. The settings image also has a tab image 110 attached thereto.

Figure 13:
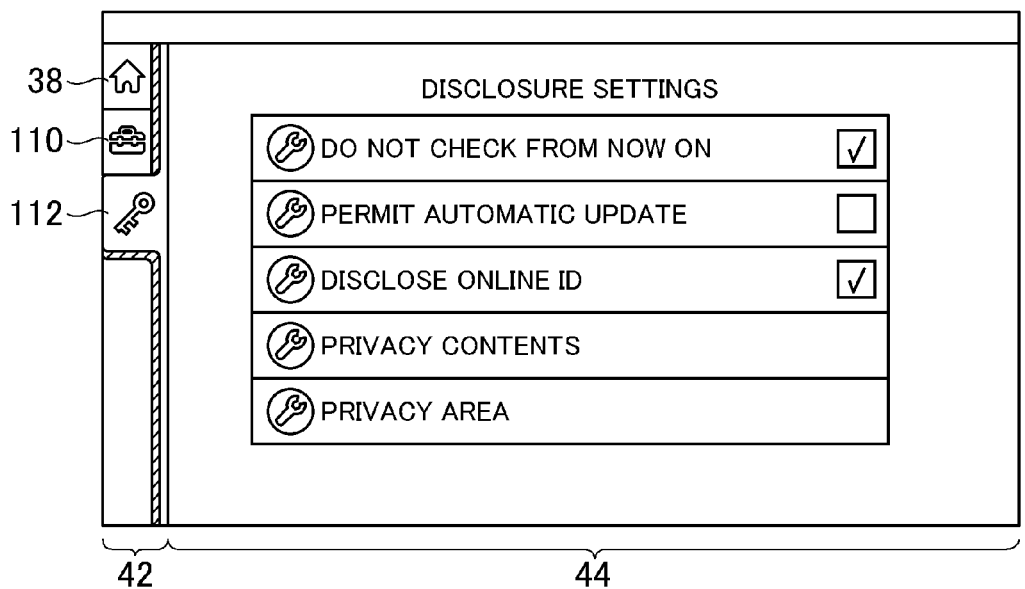
FIG. 13 is a diagram illustrating an example of a disclosure settings image.

When a user taps an area displayed as "disclosure settings" in the settings image, a disclosure settings image illustrated as an example in FIG. 13 is displayed on the touch screen 16a. The user can switch their privacy settings to one of "public" and "private" by tapping a check box that is placed to the right of an area displayed as "disclose your online ID." The disclosure settings image also has a tab image 112 attached thereto.

Figure 14:
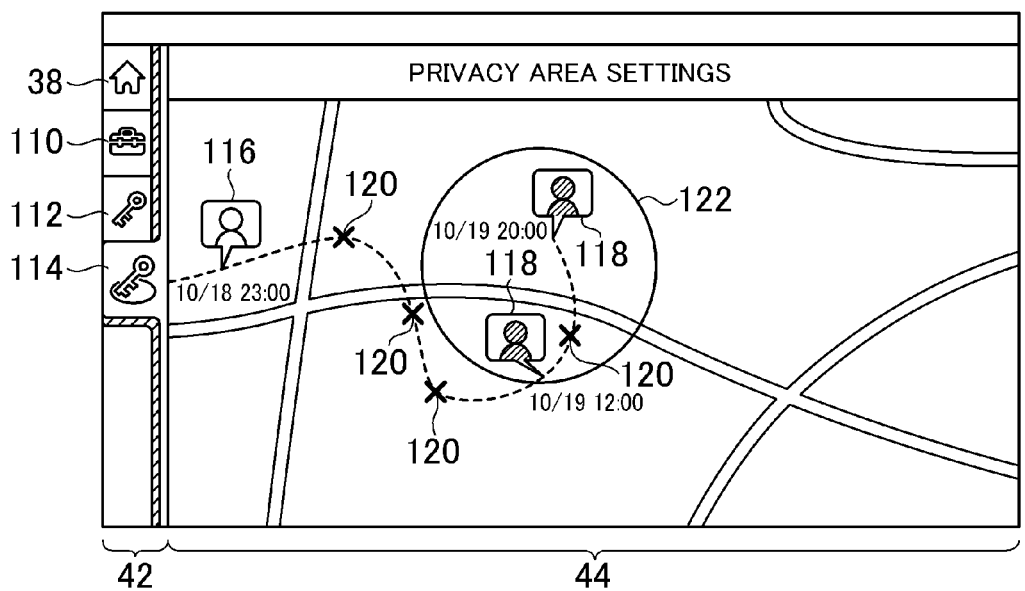
FIG. 14 is a diagram illustrating an example of a privacy area settings image.

When the user taps an area displayed as a privacy area in the disclosure settings image with the private settings set to "public," a privacy area settings image illustrated as an example in FIG. 14 is displayed on the touch screen 16a. The user can set a given number of (for example, five at maximum) privacy areas in the privacy area settings image. In this embodiment, the user terminal 16 stores the position coordinates (latitude and longitude) of the center point of each set privacy area at this point. The privacy area settings image also has a tab image 114 attached thereto. In this embodiment, the inside of a privacy area is separated from the outside by a circle that corresponds to a geographical circular area having a diameter of 2 km.

A procedure of using a tab image to display an image in the main area 44 which is already displayed is described. The user can tap one of the tab images displayed in the tab area 42 to make the user terminal 16 display again in the main area 44 an image that is associated with the tapped tab image. For instance, in the case where the main menu image of FIG. 3, the travel route image of FIG. 5, the radar image of FIG. 7, the ranking image of FIG. 8, and the title profile image of FIG. 9 have been displayed in the main area 44 in the order stated, the tab images 38, 40, 54, 56, and 58 which are respectively associated with these images are displayed in the tab area 42 in the same order from the top of the screen. If the tab image 54 out of the displayed tab images is tapped, the display returns to FIG. 7. Specifically, the radar image which is associated with the tab image 54 specified by the user is displayed again in the main area 44. At this point, the tab images 56 and 58 which have appeared in the tab area 42 after the tapped tab image 54 are deleted from the tab area 42.

Figure 15:
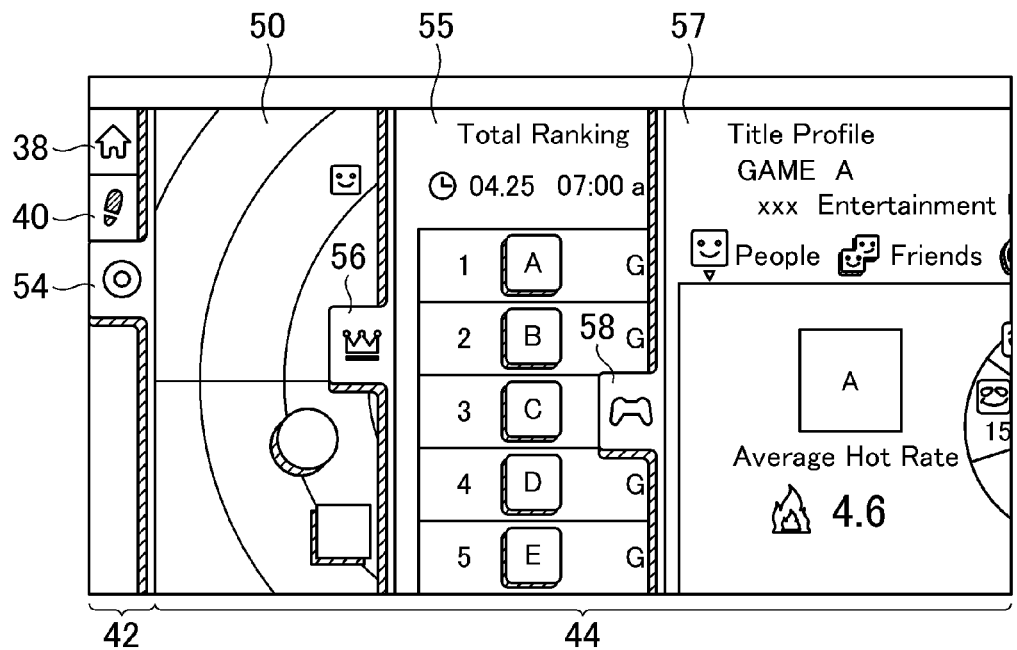
FIG. 15 is a diagram illustrating a switch from the title profile image to the radar image.

Specifically, as illustrated in FIG. 15, the title profile image slides rightward with the tab image 58 attached thereto and disappears from the right edge of the touch screen 16a. After the tab image 58 and the title profile image start moving and before these images disappear, the ranking image with the tab image 56 attached thereto also slides rightward and disappears from the right edge of the touch screen 16a. In the virtual three-dimensional space, images displayed in the main area 44 (objects on the base) are spaced apart from one another, and arranged in the order that the images have been displayed, with the image that has been displayed last placed closest to the virtual camera side. A tab image and its associated image are placed on the same plane. Therefore, when the image in the main area 44 moves by sliding, an image that has been displayed in the main area 44 immediately before the moving image appears. In this manner, the title profile image and the ranking image, which have been displayed after the radar image which is associated with the tab image 54 specified by the user, are moved together with the tab images 58 and 56 in the reverse order that the images have been displayed, and the radar image which is associated with the tab image 54 specified by the user is thereby displayed again in the main area 44. This helps the user to grasp which images have been displayed in the main area 44 in what manner.

Figure 16:
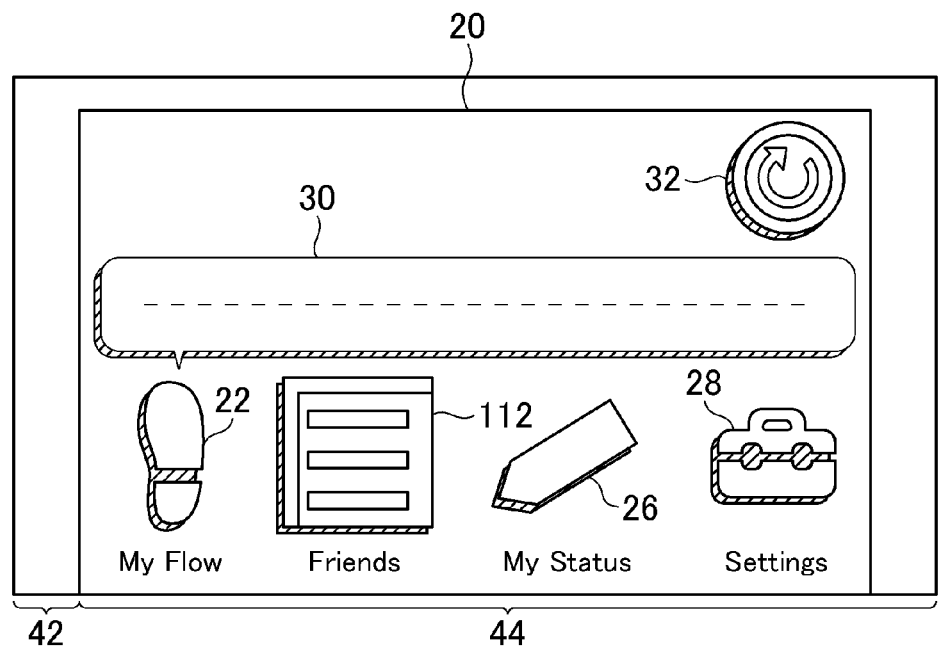
FIG. 16 is a diagram illustrating an example of the main menu image displayed again.

When the tab image 38 displayed in the tab area 42 is tapped, the main menu image associated with the tab image 38 is displayed again in the main area 44 as illustrated in FIG. 16. The tab image 38 which has been displayed in the tab area 42 disappears at this point. Of the buttons 22, 24, 26, and 28 displayed in the main menu image, an already tapped button is replaced with a reduced copy of the image that has been displayed in the main area 44 immediately before the main menu image is displayed again. Tapping the reduced image also causes the user terminal 16 to display the travel route image, the friend image, the status image, or the settings image in the main area 44. Displaying the reduced image helps the user to immediately grasp what operation has been performed. To display more tab images than the given number in the tab area 42, the tab images are placed virtually by arranging the tab images two-dimensionally in the up-down direction, and the tab area 42 displays only the given number of adjacent tab images at a time. Flicking the tab area 42 causes the user terminal 16 to display another set of the given number of tab images in the tab area 42. The user can thus make the user terminal 16 display any already displayed image again in the main area 44 by causing the tab area 42 to display the relevant tab image with a flick and then tapping this tab image. The size of each tab image is not reduced even though the number of tab images displayed in the tab area 42 exceeds the given number, which makes it easy for the user to tap the tab images.

Processing of determining the position of each record frame 34 in the travel route image of FIG. 5 is described. As illustrated in FIG. 5, the record frames 34 are staggered in the left-right direction and are side by side in the up-down direction. The staggering in the left-right direction is created in a manner that indicates the positioning time of each record frame 34. The gap between two adjacent record frames 34 indicates the distance between positions that correspond to the record frames 34 and whether or not the positioning time of one record frame 34 and the positioning time of the other record frame 34 sandwich a given time (for example, 3 a.m.).

Figure 17:
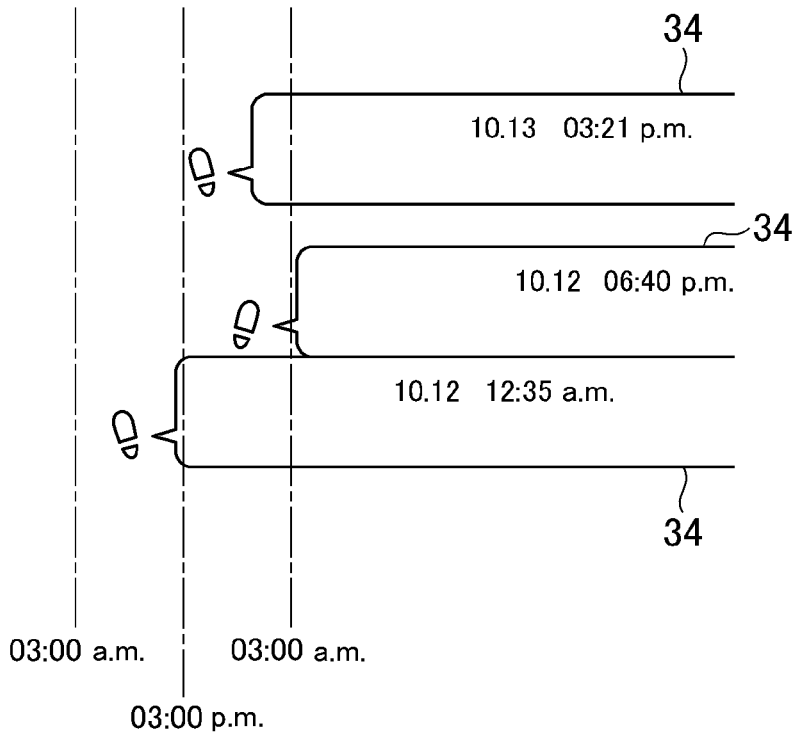
FIG. 17 is a diagram illustrating the arrangement of records that are contained in the travel route image.

To elaborate, as illustrated in FIG. 17, the display positions of the record frames 34 have a given width in the left-right direction, and the left edge of the given width corresponds to a given reference time whereas the right edge of the given width corresponds to twenty-four hours past the reference time. To display one record frame 34, the user terminal 16 obtains the positioning time of a position that corresponds to this record frame 34, and calculates the position of the positioning time in the given width in the left-right direction. With the left edge of the given width as the given reference time and the right edge of the given width as a time twenty-four hours past the given reference time, it is assumed that the distance from the left edge and the time elapsed from the given reference time have a linear relation. Specifically, a point that is reached by moving away from the left edge of the given width by alpha % corresponds to a time that is 24×(alpha)/100 hours past the given reference time. This enables the user to grasp an approximate positioning time by just looking at the display position of the record frame 34 in the left-right direction.

Figure 18:
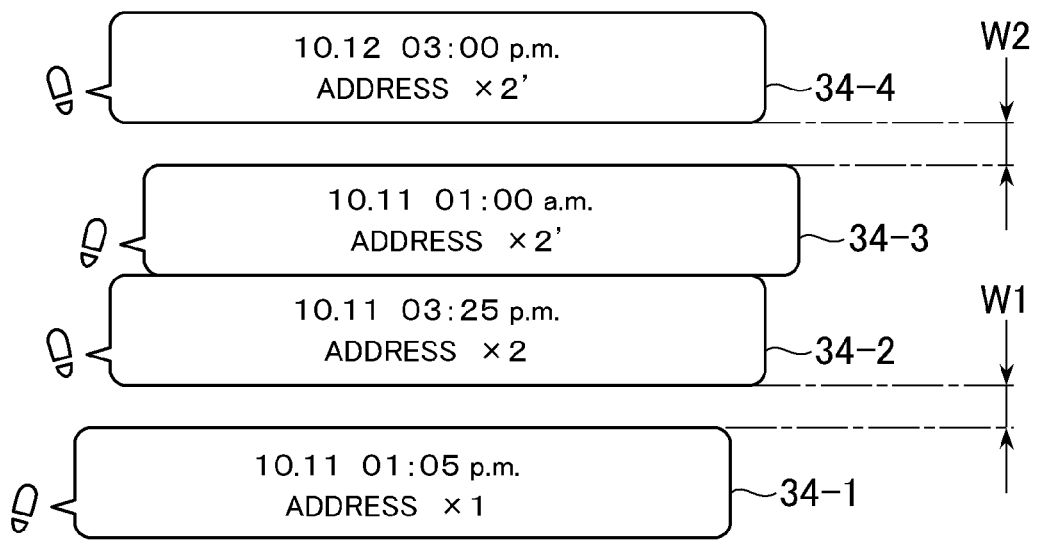
FIG. 18 is a diagram illustrating the arrangement of records that are contained in the travel route image.

As illustrated in FIG. 18, when the gap between the position coordinates of a position that corresponds to one record frame 34 and the position coordinates of a position that corresponds to its adjacent record frame 34 is less than a given distance (for example, 10 km), these record frames 34 are displayed with a zero-gap between the two. In other words, the two are displayed right next to each other. For instance, in FIG. 18, the distance between the position coordinates of positions that correspond to record frames 34-2 and 34-3 does not exceed 10 km, and the record frames 34-2 and 34-3 are displayed next to each other without any gap between the two.

When the gap between the position coordinates of a position that corresponds to one record frame 34 and the position coordinates of a position that corresponds to its adjacent record frame 34 is equal to or more than the given distance, these record frames 34 are displayed with a linear gap which is determined by how much the given distance is exceeded. The gap between the displayed record frames 34 must not exceed a given upper limit gap Wmax. For instance, in FIG. 18, the distance between the position coordinates of a position that corresponds to a record frame 34-1 and the position coordinates of a position that corresponds to the record frame 34-2 is equal to or more than 10 km, and the displayed record frames 34-1 and 34-2 are spaced apart from each other by a distance W1 (W1<=Wmax), which is calculated by subtracting 10 km from the distance between the position coordinates and then multiplying the difference by a given coefficient.

In the case where the positioning time of one record frame 34 and the positioning time of its adjacent record frame 34 sandwich a given time (for example, 3 a.m.), these record frames 34 are displayed with a gap that is a given fraction (20%, for example) of the upper limit gap Wmax. The gap between the displayed record frames 34 must not exceed the upper limit Wmax in this case, too. For instance, in FIG. 18, the distance between the position coordinates of a position that corresponds to the record frame 34-3 and the position coordinates of a position that corresponds to a record frame 34-4 is less than 10 km but the positioning time of the record frame 34-3 and the positioning time of the record frame 34-4 sandwich 3 a.m., and the displayed record frames 34-3 and 34-4 are spaced apart from each other by a distance W2 (W2<=Wmax), which is a given fraction of the given upper limit gap Wmax. With the travel route image designed in the manner described above, the user can know the gap between the position coordinates of a position that corresponds to one record frame 34 and the position coordinates of a position that corresponds to its adjacent record frame 34, and the positioning dates of the record frames 34, just by looking at the gap between the displayed record frames 34.

Figure 19:
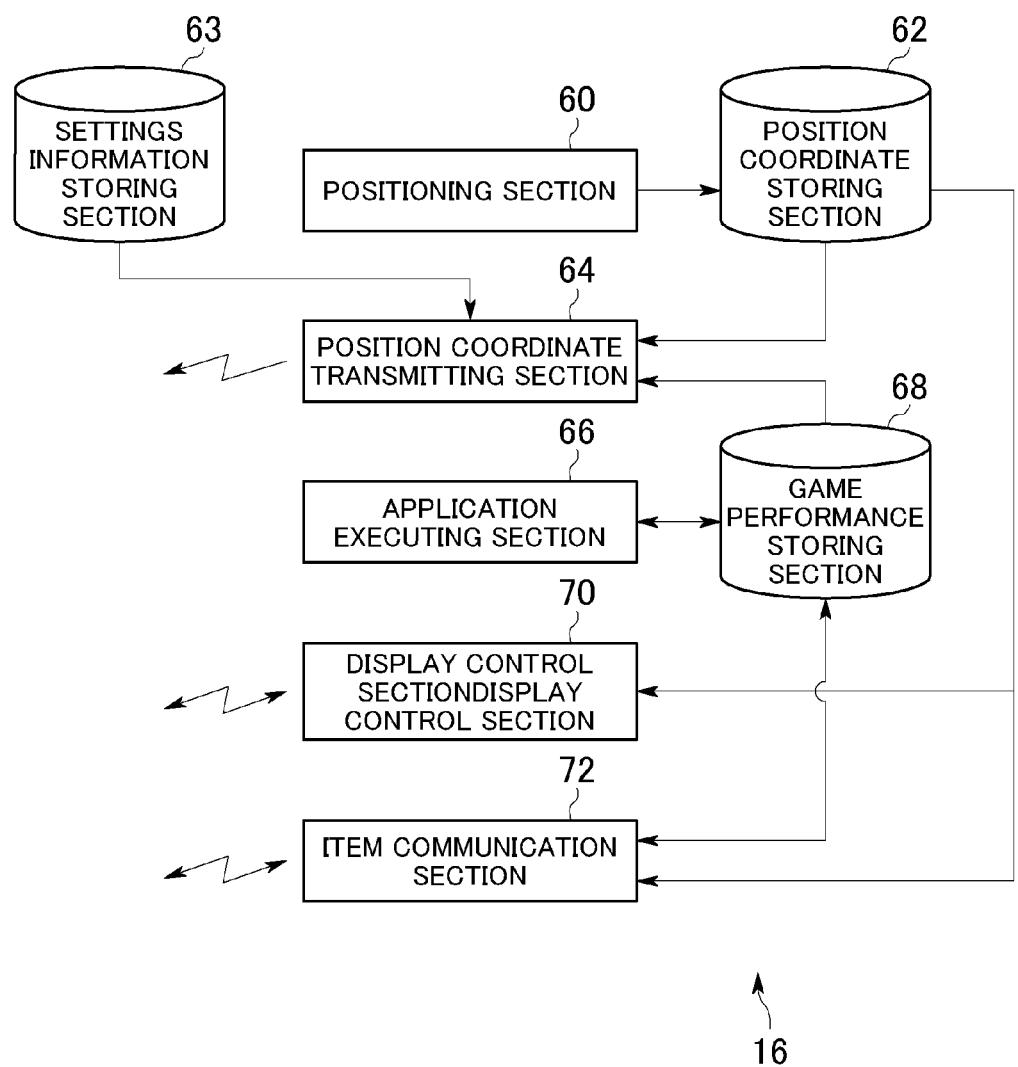
FIG. 19 is a function block diagram of the user terminal.
Figure 20:
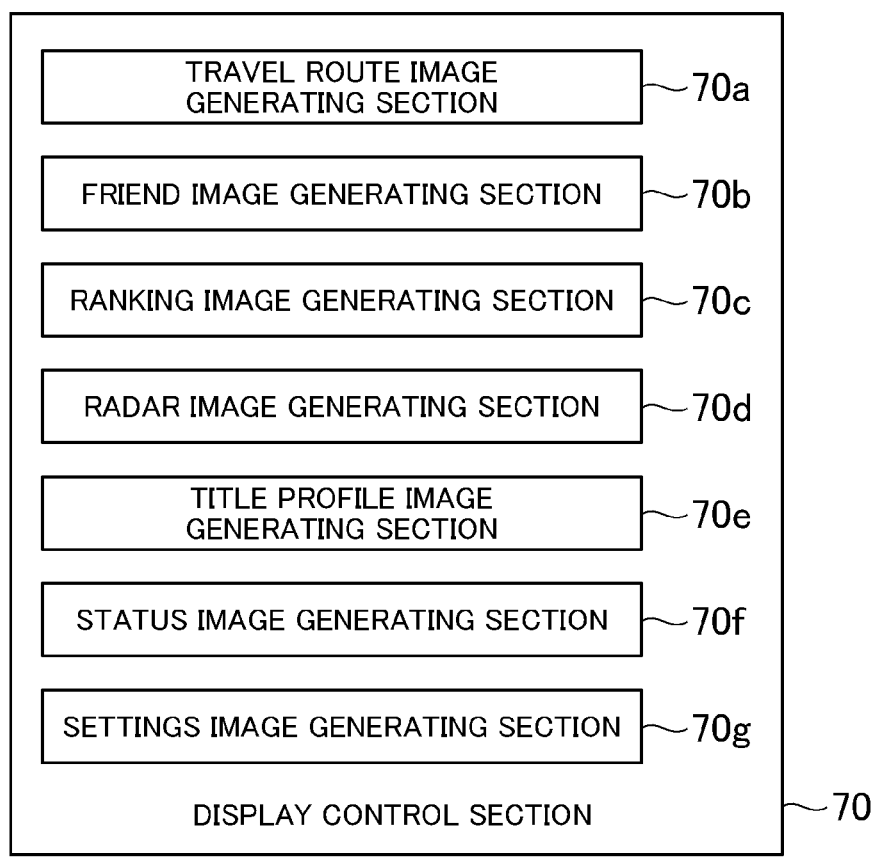
FIG. 20 is a diagram illustrating the configuration of a display control sectiondisplay control section.

The configuration of the communication system described above is described in more detail. FIGS. 19 and 20 are function block diagrams of each user terminal 16. As illustrated in FIG. 19, the user terminal 16 includes as functional components a positioning section 60, a position coordinate storing section 62, a settings information storing section 63, a position coordinate transmitting section 64, an application executing section 66, a game performance storing section 68, the display control sectiondisplay control section 70, and an item communication section 72. The display control section-display control section 70 includes, as illustrated in FIG. 20, a travel route image generating section 70*a*, a friend image generating section 70*b*, a ranking image generating section 70*c*, a radar image generating section 70*d*, a title profile image generating section 70*e*, a status image generating section 70*f*, and a settings image generating section 70*g*. These function components are implemented by executing a program according to the embodiment of the present invention on the user terminal 16, which is a computer game system. This program may be downloaded from another computer via the computer communication network 10, or may be stored in a computer-readable information storage medium such as a CD-ROM or a DVD-ROM to be installed in the user terminal 16. In the latter case, the user terminal 16 has a built-in or external medium reading device for reading the program out of the medium.

The positioning section 60 is constituted mainly of the positioning unit 16*b*. The positioning section 60 periodically (for example, every thirty minutes) activates the positioning unit 16*b* to receive satellite signals (GPS signals) and generate position coordinates (latitude and longitude) from the received signals. The positioning section 60 may activate the positioning unit 16*b* to receive satellite signals and generate position coordinates from the received signals also when the user gives via the touch screen 16*a* an explicit instruction to perform positioning. Alternatively, the positioning section 60 may obtain the position coordinates of the user terminal 16 based on identification information and other types of necessary information of a wireless access point with which the wireless LAN communication unit 16*d* can communicate. For instance, a not-shown server stores in advance identification information of a wireless access point in association with position coordinates, and the positioning section 60 transmits identification information to the server to obtain position coordinates that are associated with the identification information. The positioning section 60 may transmit, to the server, identification information of a plurality of wireless access points and the intensity of radio waves from each wireless access point. The server in this case performs weighting based on the radio wave intensity, combines the position coordinates of the wireless access points to calculate the position coordinate of the user terminal 16, and returns the calculated coordinates to the positioning section 60. Similarly, the position coordinates of the user terminal 16 may be obtained based on identification information and other types of necessary information of a cellular phone base station with which the cellular phone communication unit 16*c* can communicate. Instead of the positioning section 60 obtaining the position coordinates of the user terminal 16 and transmitting the obtained coordinates to the user position management server 12, the user position management server 12 may obtain position coordinates indicated by identification information and other types of necessary information of a wireless access point or a cellular phone base station that are transmitted from the positioning section 60.

As illustrated in FIG. 21, the position coordinate storing section 62 stores a given number of (for example, twenty) position coordinate sets and calculating dates/times of the position coordinates in association with each other. The positioning section 60 reads position coordinates stored last in the position coordinate storing section 62 each time new position coordinates are generated, and calculates the distance between the newly generated position coordinates and the read position coordinates. When the calculated distance is equal to or more than a given distance (for example, 2 km), the position coordinate storing section 62 stores the newly generated position coordinates along with the calculating date/time of the position coordinates. At this point, position coordinates that have been stored longer than a given number of days (seven days, for example) are deleted along with the calculating date/time of the expired position coordinates. If the position coordinate storing section 62 is storing the given number of position coordinate sets in association with their calculating dates/times and none of the position coordinate sets have been stored longer than the given number of days, the oldest position coordinates and their calculating date/time are deleted in order to store newly generated position coordinates and their calculating date/time instead. When the distance between the newly generated position coordinates and the read position coordinates is less than the given distance, on the other hand, the new position coordinates are discarded instead of being stored in the position coordinate storing section 62.

The application executing section 66 executes an application program such as a game program. The application program may be downloaded from another computer via the computer communication network 10 or may be stored in a computer-readable information storage medium such as a CD-ROM or a DVD-ROM to be installed in the user terminal 16.

As illustrated in FIG. 22, the game performance storing section 68 stores a title ID, a viewing level, a total play time, and a last play date/time in association with each other for each of a given number of (for example, five) game programs that have been executed lately by the application executing section 66. The title ID is information for identifying each game program. The total play time indicates the total length of time the game program identified by the title ID has been played. The viewing level is information indicating how enthusiastic the user is about the game program which is calculated from such information as the difference between the release date of the game program and the current date, and the total play time. The last play date/time indicates the date/time (activation date/time or shutdown date/time) when the game program has been played the last time.

The settings information storing section 63 stores various types of information that indicates settings concerning the user. To give a concrete example, the settings information storing section 63 stores privacy settings data, which indicates the user's privacy settings (the value of which is "public" or "private"), and privacy area center point data, which indicates the position coordinates (latitude and longitude) of the center point of one of up through five privacy areas. The user can set the values of the privacy settings data and the privacy area center point data to be stored in the settings information storing section 63 by operating the disclosure settings image and the privacy area settings image which are displayed on the touch screen 16*a*.

The position coordinate transmitting section 64 uses the cellular phone communication unit 16*c* or the wireless LAN communication unit 16*d* to transmit, to the user position management server 12, the plurality of position coordinate sets and their calculating dates/times stored in the position coordinate storing section 62, and the title IDs, viewing levels, and total play times of the given number of game programs stored in the game performance storing section 68. This transmission may be executed when the user gives through the touch screen 16*a* an explicit instruction to transmit.

Figure 23:
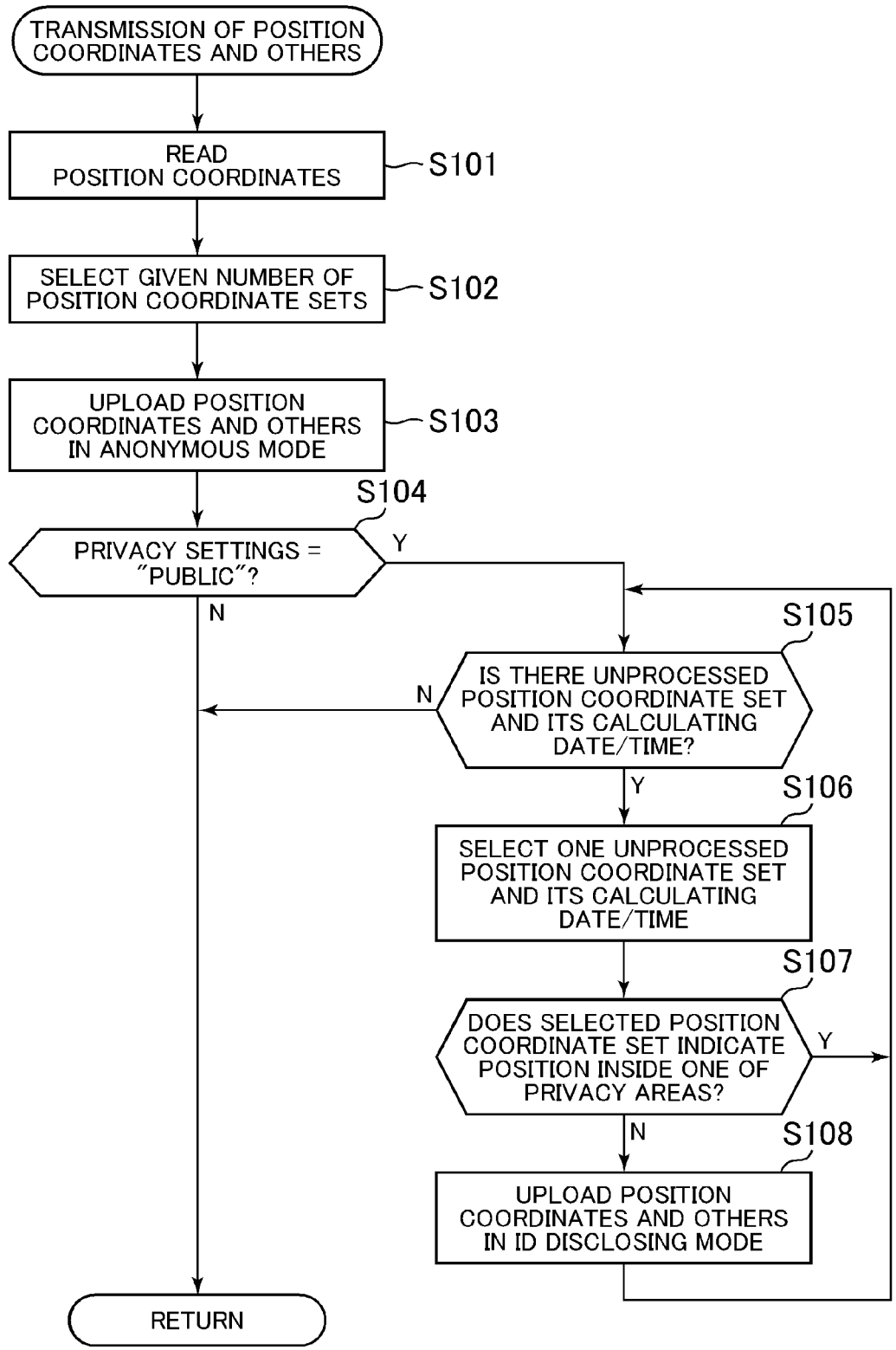

An example of the processing executed by the position coordinate transmitting section 64 to transmit the position coordinates and others to the user position management server 12 is described with reference to a flow chart example of FIG. 23.

The position coordinate transmitting section 64 first reads position coordinate sets and calculating dates/times out of the position coordinate storing section 62 (S101). The position coordinate transmitting section 64 then selects a given number of position coordinate sets and their calculating dates/times suitable for representing the user's travel route in the manner described above (S102). The position coordinate transmitting section 64 transmits, to the user position management server 12, the position coordinate sets and their calculating dates/times selected in S102, and the title IDs, viewing levels, and total play times of the given number of game programs stored in the game performance storing section 68 (S103). The processing of S103 is referred to as processing of uploading position coordinates and others in an anonymous mode.

The position coordinate transmitting section 64 determines whether or not the user's privacy settings are set to "public" (S104). When the privacy settings are not set to "public" (namely, "private") (S104: N), the processing described in this processing example is ended. When the privacy settings are set to "public" (S104: Y), the position coordinate transmitting section 64 checks whether or not position coordinate sets and their calculating dates/times for which S106 and the subsequent steps have not been executed are found among the position coordinates and their calculating dates/times selected in S102 (S105). When there are position coordinate sets and their calculating dates/times that meet the condition (S105: Y), the position coordinate transmitting section 64 selects one of the position coordinate sets for which the processing described in this processing example has not been performed, and the calculating date/time of the selected position coordinate set, as a processing subject (S106). The position coordinate transmitting section 64 checks whether or not the position coordinate set selected in S106 is within one of the privacy areas (S107). In other words, the position coordinate transmitting section 64 checks whether or not there is a position coordinate set that is within a given distance (for example, 1 km) from the position coordinate set selected in S106 and that is set as the value of the privacy area center point data (S107). When there is a position coordinate set that meets the condition (S107: Y), the processing proceeds to S105. When there is no position coordinate set that meets the condition (S107: N), the position coordinate transmitting section 64 transmits, to the user position management server 12, the position coordinate set selected in S106 and its calculating date/time, and the title IDs, viewing levels, and total play times of the given number of game programs stored in the game performance storing section 68, in association with the user ID of the user who is using the user terminal 16 (S108). The position coordinate transmitting section 64 then proceeds to S105. The processing of S108 is referred to as processing of uploading position coordinates and others in an ID disclosing mode.

In the case where it is confirmed in S105 that position coordinate sets and their calculating dates/times for which S106 and the subsequent steps have not been performed are not found among the selected position coordinate sets and their calculating dates/times (S105: N), the processing described in this processing example is ended.

It is preferred if the position coordinate transmitting section 64 displays a plurality of position coordinate sets and their calculating dates/times stored in the position coordinate storing section 62 on the touch screen 16a to check whether or not the user wishes to transmit the displayed position coordinate sets and calculating dates/times. The position coordinate transmitting section 64 may be further capable of removing position coordinate sets and their calculating dates/times that the user does not wish to transmit and transmitting only the rest to the user position management server 12. The user may set the user terminal 16 to omit this checking. In this case, a plurality of position coordinate sets and their calculating dates/times stored in the position coordinate storing section 62 are transmitted automatically and periodically (for example, once a day).

The display control sectiondisplay control section 70 and the item communication section 72 are described later.

Figure 24:
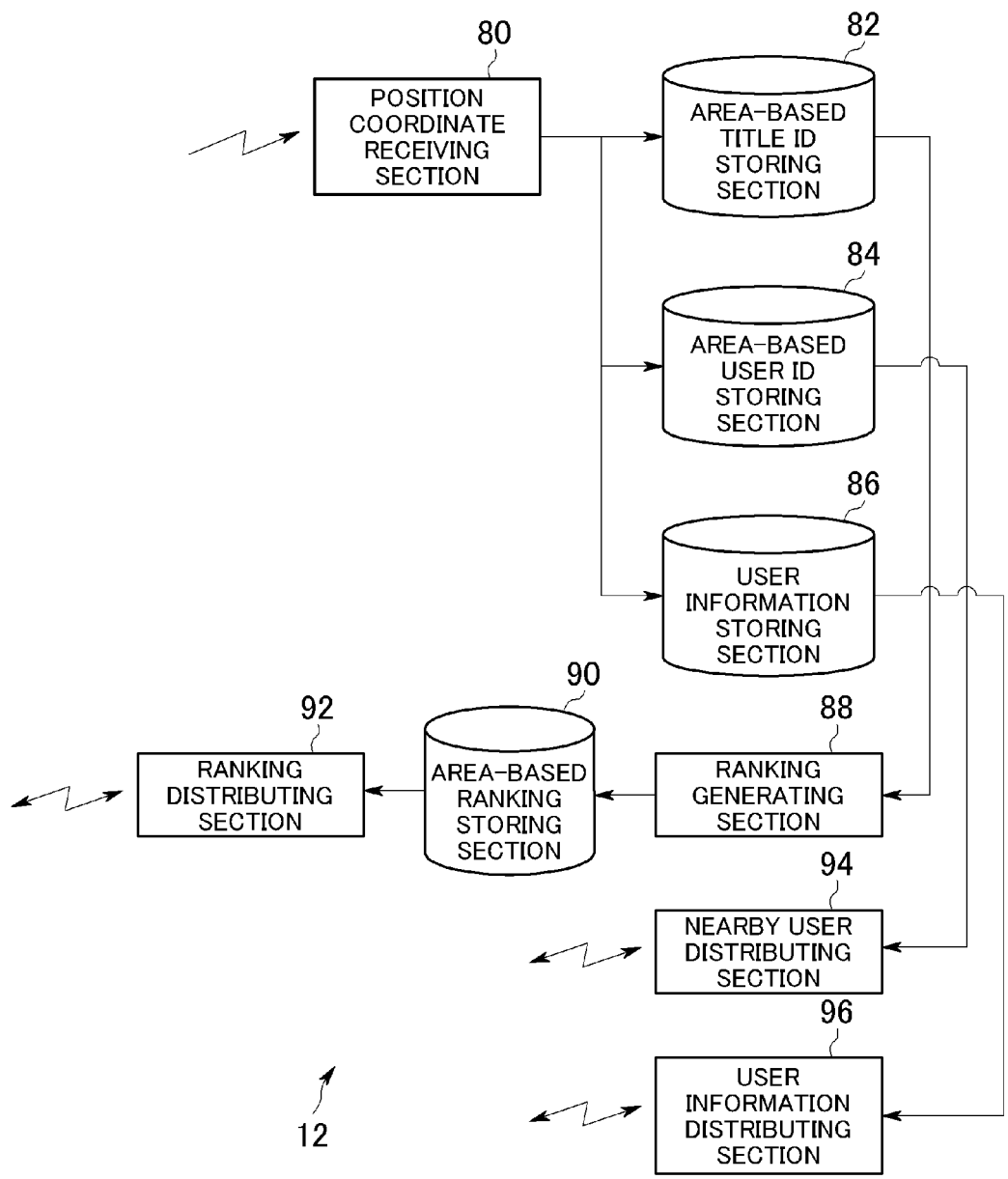
FIG. 24 is a function block diagram of a user position management server.

FIG. 24 is a function block diagram of the user position management server 12. As illustrated in FIG. 24, the user position management server 12 includes as functional components a position coordinate receiving section 80, an area-based title ID storing section 82, an area-based user ID storing sectionarea-based user ID storing section 84, a user information storing sectionuser information storing section 86, a ranking generating section 88, an area-based ranking storing section 90, a ranking distributing section 92, a nearby user distributing section 94, and a user information distributing section 96. These function components are implemented by executing the program according to the embodiment of the present invention on the user position management server 12, which is a computer. This program may be downloaded from another computer via the computer communication network 10, or may be stored in a computer-readable information storage medium such as a CD-ROM or a DVD-ROM to be installed in the user position management server 12.

The position coordinate receiving section 80 receives a plurality of position coordinate sets and their calculating dates/times and game performance data (title IDs, viewing levels, and total play times) of the given number of game programs which are transmitted from the position coordinate transmitting section 64 of each user terminal 16.

As illustrated in FIG. 25, the area-based title ID storing section 82 stores an area ID, a time slot, and a given number of (for example, twenty) game performance data pieces in association with one another. The area ID is information for identifying (specifying) each mesh cell area created by dividing a management subject area (for example, the entire area covering the Earth) into a plurality of mesh cells. The time slot is information for identifying a time range having a given length of time (for example, six hours). Each game performance data piece contains a title ID, a viewing level, and a total play time. In other words, the area-based title ID storing section 82 stores a given number of (for example, twenty) game performance data pieces in association with an area ID and a time slot. For instance, when receiving a plurality of position coordinate sets and their calculating dates/times and a given number of game performance data pieces from one user terminal 16 through the processing of uploading position coordinates and others in the anonymous mode of S103 described above, the position coordinate receiving section 80 derives for each received position coordinate set the area ID of an area that contains the position coordinate set. The position coordinate receiving section 80 also derives a time slot that contains the calculating date/time of the received position coordinate set. The position coordinate receiving section 80 stores the game performance data received from the user terminal 16 in the area-based title ID storing section 82 in association with the derived area ID and the derived time slot. If the given number of game performance data pieces are already stored in a relevant part of the area-based title ID storing section 82 at this point, the oldest game performance data is deleted and the game performance data received this time is stored instead.

As illustrated in FIG. 26, the area-based user ID storing sectionarea-based user ID storing section 84 stores for each area ID a user ID, a position coordinate set, and a calculating date/time in association with one another. For instance, when receiving a plurality of position coordinate sets and their calculating dates/times, and the title IDs, viewing levels, and total playtimes of a given number of game programs in association with a user ID from one user terminal 16 through the processing of uploading position coordinates and others in the ID disclosing mode of S108 described above, the position coordinate receiving section 80 derives for each received position coordinate set the area ID of an area that contains the position coordinate set. The user ID of the user who is using the user terminal 16 and the received position coordinate set and calculating date/time are stored in the area-based user ID storing sectionarea-based user ID storing section 84 in association with the derived area ID. A position coordinate set and its calculating date/time that has been stored longer than a given length of time (for example, one week) is deleted from the area-based user ID storing sectionarea-based user ID storing section 84.

As illustrated in FIG. 27, the user information storing sectionuser information storing section 86 stores a user ID, a latest position coordinate set, a calculating date/time, and a given number of (for example, twenty) game performance data pieces in association with one another. For instance, when receiving a plurality of position coordinate sets and their calculating dates/times, and a given number of game performance data pieces in association with the user ID of one user terminal 16 through the processing of uploading position coordinates and others in the ID disclosing mode of S108 described above, the position coordinate receiving section 80 stores the position coordinate set obtained last and its calculating date/times and the received given number of game performance data pieces in the user information storing sectionuser information storing section 86 in association of the user ID of the user who is using the user terminal 16.

The ranking generating section 88 generates the ranking of game titles for each area ID based on data stored in the area-based title ID storing section 82. For instance, the number of game performance data pieces that are stored on an area ID basis in the area-based title ID storing section 82 in association with time slots within a given period of time (for example, past one month) are aggregated for each title ID, and top ten titles are used to generate ranking. Data of this ranking includes the total game performance data count (gross player count) of each title ID. Alternatively, viewing levels of game performance data that are stored on an area ID basis in the area-based title ID storing section 82 in association with time slots within a given period of time (for example, past one month) are averaged for each title ID, and top ten of the average values are used to generate ranking. Data of this ranking, too, includes the total game performance data count (gross player number) of each title ID. Data of the generated ranking is stored in the area-based ranking storing section 90 in association with area IDs. The ranking distributing section 92 receives a set of position coordinates from one user terminal 16, derives the area ID of an area that contains the received position coordinate set, reads ranking that is stored in the area-based ranking storing section 90 in association with the derived area ID, and returns the read ranking to the user terminal 16.

The nearby user distributing section 94 receives a set of coordinates and the specification of a search area size from one user terminal 16, and sets as the search area a group of n×n (e.g., 1×1, 3×3, 5×5, 7×7, 9×9, . . . , 25×25) areas that include the area containing the received position coordinate set (for example, at the center point of the area). The variable n is determined by the specification of a search area size received from the user terminal 16. The nearby user distributing section 94 then reads every user ID and every position coordinate set that are stored in the area-based user ID storing sectionarea-based user ID storing section 84 in association with the area ID of each area constituting the determined search area and returns the read user ID and position coordinate set to the user terminal 16.

The user information distributing section 96 receives a user ID from one user terminal 16, and returns to the user terminal 16 the latest position coordinate set, its calculation data, and a given number of game performance data pieces that are stored in the user information storing sectionuser information storing section 86 in association with the received user ID. When the user of one user terminal 16 wishes to see on the touch screen 16a the title of a game that is being played by a specific user, the user receives this information from the user information distributing section 96.

Processing executed by each user terminal 16 to display various screens is described. The display control sectiondisplay control section 70 of the user terminal 16 includes, as described above, the travel route image generating section 70a, the friend image generating section 70b, the ranking image generating section 70c, the radar image generating section 70d, the title profile image generating section 70e, the status image generating section 70f, and the settings image generating section 70g.

Figure 28:
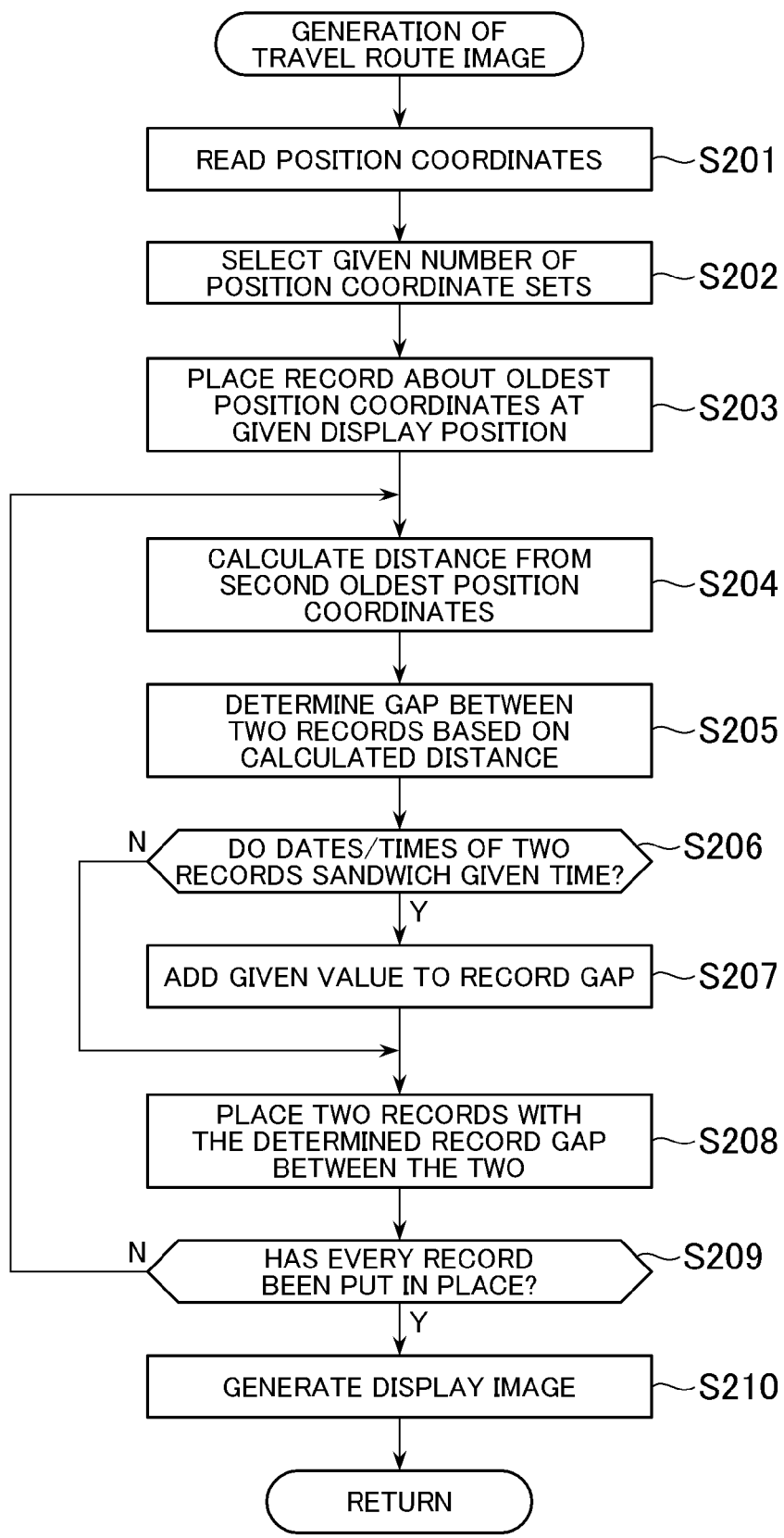
FIG. 28 is a flow chart illustrating travel route image generating processing.

The travel route image generating section 70a generates the travel route image of FIG. 5. To generate the travel route image, the travel route image generating section 70a first reads position coordinate sets and their calculating dates/times out of the position coordinate storing section 62 as illustrated in FIG. 28 (S201). The travel route image generating section 70a then selects a given number of position coordinate sets suitable for representing the user's travel route and their calculating dates/times in the manner described above (S202).

Next, the record frame 34 that has the oldest calculating date/time is placed at a given position which is set in a lower part of the travel route image (S203). The distance between position coordinates that have the second oldest calculating date/time and position coordinates whose calculating date/time precedes the second oldest calculating date/time is calculated (S204). Based on the calculated distance, the gap to be placed between the displayed record frames 34 is determined temporarily (S205). Specifically, the temporary gap is zero when the calculated distance is less than a given reference distance. When the calculated distance is equal to or more than the given reference distance, the temporary gap is set to a value obtained by subtracting the given reference distance from the calculated distance and multiplying the difference by a given coefficient. However, if the temporary gap exceeds the upper limit gap Wmax, the temporary gap is replaced with Wmax.

The travel route image generating section 70a then determines whether or not the calculating dates/times of the two record frames 34 sandwich a given time (S206) and, when the given time is sandwiched, a given fraction of the upper limit gap Wmax is added to the temporary gap to update the temporary gap (S207). In this case, too, the temporary gap is replaced with Wmax if the updated gap exceeds the upper limit gap Wmax. The temporary gap updated in this manner is used as the final gap in determining the display position of the record frame 34. Specifically, the display position of the second oldest record frame is set to a point that is above the record frame of the position coordinates whose calculating date/time immediately precedes the second oldest calculating date/time, and that is moved from the preceding record frame 34 by an amount equivalent to the gap calculated in S204 to S207. The display position of the second oldest record frame 34 in the left-right direction is determined based on the calculating time in the manner illustrated in FIG. 17. The steps S204 to S208 are repeated until the display position is determined for every record frame 34. Thereafter, an image of each record frame 34 is generated at the determined display position.

At this point, the travel route image generating section 70a obtains for each position coordinate set an address letter string that corresponds to the position coordinate set. The address letter string may be stored in the user terminal 16 in advance in association with a range of position coordinates, or may be stored in the information server 14 in the same manner. In the latter case, when a set of position coordinates is transmitted to the information server 14, the information server 14 reads an address letter string associated with a range that contains the transmitted position coordinate set, and transmits the read address letter string to the user terminal 16. Address letter strings obtained in this manner are included along with calculating dates/times in the travel route image in the order of calculating date/time.

Next, the travel route image generating section 70a transmits to the user position management server 12 each position coordinate set selected in S202 to request to generate ranking. In response to the request, the ranking distributing section 92 of the user position management server 12 derives the area ID of an area that contains the received position coordinate set, reads ranking that is stored in the area-based ranking storing section 90 in association with the derived area ID, and returns the read ranking to the user terminal 16. In the case where ranking associated with the same area ID has already been received from the user position management server 12, the travel route image generating section 70a compares the already received ranking and the newly received ranking. A game title with a rank that has increased most and a game title that has increased most in values that are the basis of the ranking (the total game performance data count, an average value of viewing levels, and the like) are included in the travel route image as hot titles (Reference Symbol 36). In the case where ranking associated with the same area ID has not been received yet from the user position management server 12, a game title that has the highest rank in the currently received ranking is included in the travel route image as a hot title.

The travel route image generating section 70a transmits to the user position management server 12 each position coordinate set stored in the position coordinate storing section 62 and a size specification that specifies 1×1 area as the search area, thereby requesting the user position management server 12 to search for nearby users. In response to the request, the nearby user distributing section 94 of the user position management server 12 derives the area ID of an area that contains the received position coordinate set, reads every user ID and every position coordinate set that are stored in the area-based user ID storing sectionarea-based user ID storing section 84 in association with the derived area ID, and returns the read user ID and position coordinate set to the user terminal 16. The travel route image generating section 70a counts up the number of user IDs associated with each position coordinate set, and displays as many situation images 34a as the counted number of user IDs in the record frame 34 concerning the position coordinate set.

The user terminal 16 stores the user IDs of friends of its own user. When the user ID of a friend stored in the user terminal 16 is included among user IDs transmitted from the nearby user distributing section 94 of the user position management server 12, the user terminal 16 modifies the situation image 34a in the record frame 34 that is associated with the friend user ID in a manner that informs the user of the fact (for example, by including an exclamation mark in the situation image 34a).

The friend image generating section 70b generates the friend image of FIG. 10. To generate the friend image, the friend image generating section 70b reads friend user IDs stored in the user terminal 16, and receives latest information associated with the read user IDs from the information server 14. The latest information can be messages entered by friend users from their user terminals 16 or other computers, and messages automatically generated by game programs that are executed on the user terminals 16 or other computers to indicate the game program execution state (the progress of the game, the skill level of players, and the like). The latest information is included in lower areas of entries in the friend image to complete the friend image. The friend image generated in this manner is displayed by the touch screen 16a.

The ranking image generating section 70c generates the ranking image of FIG. 8. The ranking image generating section 70c transmits a position coordinate set specified by the user to the user position management server 12, and receives ranking data from the ranking distributing section 92. The ranking image is generated based on the thus received ranking data. The generated ranking image is displayed by the touch screen 16a. The ranking image generating section 70c may receive ranking data concerning a plurality of position coordinate sets (for example, all position coordinate sets) stored in the position coordinate storing section 62 to add up for each title the values that are the basis of ranking generation (the total game performance data count, an average value of viewing levels, and the like), generate ranking from the sum, and generate and display the ranking image. This way, the user terminal 16 can display comprehensive ranking at a plurality of positions that the user has visited (for example, all positions along the travel route). The user terminal 16 may also receive ranking data concerning one of position coordinate sets that are stored in the position coordinate storing section 62 to generate and display the ranking image for ranking in a single area based on the received data.

The title profile image generating section 70e generates the title profile image of FIG. 9. The title profile image generating section 70e transmits a title ID to the information server 14 and receives information to be written in the information field. Based on the thus received information, the title profile image is generated. The generated title profile image is displayed by the touch screen 16a.

The status image generating section 70f generates the status image of FIG. 11.

The settings image generating section 70g generates the settings image of FIG. 12, the disclosure settings image of FIG. 13, and the privacy area settings image of FIG. 14.

To generate the privacy area settings image, the settings image generating section 70g first obtains from the information server 14 a map of a given size that has the current position of the user at the center. The settings image generating section 70g then selects in the manner described above a given number of position coordinate sets and their calculating dates/times from among position coordinate sets and their calculating dates/times stored in the position coordinate storing section 62 that have not been transmitted by the position coordinate transmitting section 64. For each position coordinate set selected, the settings image generating section 70g places an avatar image 116 of the user who is using the user terminal 16 at a point on the map that corresponds to the position coordinate set, and places a letter string indicating a calculating date/time that is associated with the position coordinate set near the avatar image 116. For each position coordinate set that is not selected, the settings image generating section 70g places a small image 120 which is a cross mark at a point on the map that corresponds to the position coordinate set. The settings image generating section 70g also places a curve (represented by a dashed line in the example of FIG. 14) on the map to connect points on the map that correspond to the position coordinate sets stored in the position coordinate storing section 62 that have not been transmitted by the position coordinate transmitting section 64, in ascending order of the calculating dates/times associated with the position coordinate sets. The thus generated privacy area settings image is displayed on the touch screen 16a. In this manner, the user can know which position coordinate sets are to be transmitted along with other information in the next transmission of position coordinate sets and others to the user position management server 12. The settings image generating section 70g then places a circular image 122 which indicates the range of the privacy area at the center of the touch screen 16a.

The user can slide the circular image 122 in the privacy area settings image to shift the position of the circular image 122 in the direction in which the circular image is slid. Tapping the circular image 122 sets the area inside the circular image 122 as a privacy area if the area has not been set as a privacy area (in other words, the position coordinates of the center point of this area are stored as privacy area center point data), and cancels the privacy area setting of the area inside the circular image 122 if the area has been set as a privacy area (in other words, privacy area center point data stored in association with this area is deleted from the settings information storing section 63).

When a privacy area is set, the settings image generating section 70g determines for each position coordinate set selected as described above whether or not the distance from the center point of the privacy area is within a given range (for example, within 1 km). In the case where the settings image generating section 70g determines that the position coordinate set indicates a position within the given range from the center point, the avatar image 116 of the user who is using the user terminal 16 is changed to an avatar image 118, which represents an anonymous user, at a corresponding point in the privacy area settings image. When the privacy area setting of an area is cancelled, the settings image generating section 70g determines for each position coordinate set selected as described above whether or not the distance from the center point of the cancelled privacy area is within a given range (for example, within 1 km). In the case where the settings image generating section 70g determines that the position coordinate set indicates a position within the given range from the center point, the avatar image 118 which represents an anonymous user is changed to the avatar image 116 of the user who is using the user terminal 16, at a corresponding point in the privacy area settings image. In the privacy area settings image of FIG. 14, the area inside the circular image 122 is set as a privacy area. Accordingly, each avatar image in the area covered by the circular image 122 is the avatar image 118 which represents an anonymous user and each avatar image outside the area covered by the circular image 122 is the avatar image 116 which represents the user of the user terminal 16.

The user can thus know which position coordinates are processed by the processing of uploading position coordinates and others in the ID disclosing mode and which position coordinates are not processed by the processing of uploading position coordinates and others in the ID disclosing mode despite the privacy settings being set to "public."

The radar image generating section 70d generates the radar image of FIG. 7. To generate the radar image, the radar image generating section 70d first transmits to the user position management server 12 a set of coordinates stored in the position coordinate storing section 62 that is specified by the user and a size specification that specifies a 1×1 area as the search area, and thereby requests a search for nearby users. The radar image generating section 70d then receives user IDs and sets of position coordinates that are sent from the nearby user distributing section 94 of the user position management server 12 in response to the request. If the number of the received user IDs is less than ten, the radar image generating section 70d transmits to the user position management server 12 the same position coordinate set along with a size specification that specifies 2×2 areas as the search area, to thereby request a search for nearby users again. The radar image generating section 70d repeatedly requests the user position management server 12 to execute a search for nearby users until the number of user IDs and position coordinate sets received reaches ten or higher, or until the size of the search area reaches M×M (M is a given number) areas. The radar image is generated based on user IDs and position coordinate sets received from the nearby user distributing section 94 in this manner. Specifically, the radar image generating section 70d calculates the difference between the position coordinate set specified by the user and each position coordinate set received from the nearby user distributing section 94 to determine the display positions of the avatar images 48 representing other users. In other words, the radar image generating section 70d displays the avatar images 48 at positions that are based on the positions of other user terminals 16 relative to the position of its own user terminal 16. The user terminal 16 in this embodiment thus shows an approximate distance between its position coordinates and the position coordinates of a nearby user whose privacy settings are set to "public" as the distance from the center point of the radar image to the avatar image 48 of the nearby user. The radar image generating section 70d also calculates the sum of gross player counts (the sum of gross player counts of all game titles) which are received from the ranking distributing section 92 when the travel route image is generated, and places a number of small images 52 that is determined by the calculated sum in the radar image at random. In this embodiment, the number of the small images 52 is larger when the sum of gross player counts is higher. The radar image generated in this manner, too, is displayed by the touch screen 16a. The user terminal 16 in this embodiment thus shows on the radar image an approximate number of users who are in the neighborhood of its user and are playing computer games.

When the user taps one of the avatar images 48 in the radar image, the user terminal 16 transmits to the user position management server 12 a user information distribution request in association with the user ID of a user who is represented by the tapped avatar image 48. The user information distributing section 96 of the user position management server 12 returns a latest position coordinate set, a calculating date/time, and a given number of game performance data pieces that are stored in the user information storing sectionuser information storing section 86 in association with the user ID about which the received request has been made. The user terminal 16 displays an image that is generated from this information on the touch screen 16a.

As described, in this embodiment, the user position management server 12 controls whether or not to provide information about the user terminal 16 that is an information source to the user terminal 16 that is a recipient of information, based on position coordinates that are obtained from the source user terminal and stored in the area-based user ID storing sectionarea-based user ID storing section 84 and position coordinates that are obtained from the recipient user terminal 16 and specified by the user of the recipient user terminal 16. Information stored in the area-based user ID storing sectionarea-based user ID storing section 84 in this embodiment is based on position coordinates and others transmitted from each user terminal 16 to the user position management server 12 through the processing of uploading position coordinates and others in the ID disclosing mode. This embodiment also does not allow position coordinates inside a privacy area to be transmitted to the user position management server 12 in the processing of uploading position coordinates and others in the ID disclosing mode. Accordingly, the user position management server 12 uses position coordinates outside a privacy area in controlling whether to provide information about the user terminal 16 that is an information source to the user terminal 16 that is a recipient of information.

As described, in this embodiment, position coordinates transmitted from each user terminal 16 in the ID disclosing mode are used to control whether or not to provide information about the user of the user terminal 16 that is an upload source to other user terminals 16. Position coordinates transmitted from each user terminal 16 in the anonymous mode, on the other hand, are used in the generation of ranking by the ranking generating section 88 but are not used to control whether to provide information about the user of the user terminal 16 that is an upload source to other user terminals 16.

The item communication section 72 exchanges data such as an item used in a game program. The application executing section 66 generates an item when a game program is executed, and stores identification information of this item (an item ID) in the game performance storing section 68. Once an item ID is stored in the game performance storing section 68 in this manner, the item communication section 72 transmits the item ID to the user position management server 12 along with a relevant position coordinate set stored in the position coordinate storing section 62. The user position management server 12 stores the item ID and a relevant user ID in association with the area IDs of areas that contain the position coordinate set. The uploading of an item ID is completed in this manner.

The item communication section 72 also performs processing of receiving an item ID that has been uploaded from another user. In this case, the item communication section 72 transmits one of position coordinate sets stored in the position coordinate storing section 62 to the user position management server 12. The user position management server 12 returns an item ID and a user ID that are stored in association with the area ID of an area containing the received position coordinate set. The item communication section 72 may store every item ID received in this manner in the game performance storing section 68 to provide items identified by the stored item IDs for use in game programs. Alternatively, the item communication section 72 may calculate the degree of compatibility between its own user ID and a user ID received along with an item ID to store the item ID in the game performance storing section 68 only when the calculated degree of compatibility is equal to or larger than a given value and to provide an item identified by the stored item ID for use in a game program.

The display control sectiondisplay control section 70 displays a tab image in the tab area 42 of the touch screen 16a as described above, and performs image switching processing when the tab image is tapped or when an image of a button or other object placed in an image that is displayed in the main area 44. FIG. 29 is a flow chart illustrating the image switching processing. As illustrated in FIG. 29, the display control sectiondisplay control section 70 first determines whether or not the tab image has been tapped (S301) and then determines whether or not an image of a button or other object in the main area 44 is tapped (S302). In the case where an image in the main area 44 is tapped, an image is generated by attaching a tab image to an image that is associated with the tapped image (S303). The tab image is attached to the left edge of the image specified by the user, and the attachment position in the up-down direction is determined by information in a display image management table of FIG. 30. The display image management table is a table for recording which images have been displayed in what order. The place in the display order of an image that is about to be displayed can be determined from the display image management table. In the case of the n-th image, a tab image is attached to the image displayed in the main area 44 in a manner that places the top edge of the tab image at a point reached by multiplying the length of the tab image in the longitudinal direction by (n−1) times. The display control sectiondisplay control section 70 then causes the thus generated image to appear from the right edge of the touch screen 16a (S304). The display control sectiondisplay control section 70 also updates a display image table illustrated in FIG. 27.

When it is a tab image that is tapped (S301), tab images that are displayed in the tab area 42 after the tapped tab image and images associated with these tab images are deleted (S306). Specifically, which tab images are displayed in the tab area 42 after the tapped tab image and which images are associated with the tab images are determined from the display management table. The display control sectiondisplay control section 70 slides, in order, rightward, the tab images that have lower places in the display order and images associated with these tab images according to the display management table. These images are erased from the touch screen 16a in this manner. Records corresponding to the erased tab images are then deleted from the display management table.

According to the communication system described above, a user can be aware of the presence of other users living in the same area without using short-distance wireless communication. In addition, the trail of positions calculated by the positioning unit 16b can be displayed in a manner easy for the user to comprehend without a map displayed on the touch screen 16a.

The present invention is not limited to the embodiment described above, and various modifications can be made to the invention. For instance, when position coordinates to be transmitted are inside one of privacy areas in the processing of uploading position coordinates and others in the ID disclosing mode, the position coordinate transmitting section 64 may transmit the position coordinates to the user position management server 12 in association with a "private" flag. The position coordinate receiving section 80 may store the received position coordinates and other information in the area-based user ID storing sectionarea-based user ID storing section 84 in association with the "private" flag. The nearby user distributing section 94 may be designed not to return a user ID and a position coordinate set that are stored in association with the "private" flag to the user terminal 16. In this case, the ranking generating section 88 may generate the ranking of game titles based on, in addition to position coordinates and others that are transmitted from the user terminal 16 to the user position management server 12 in the anonymous mode, position coordinates and others that are transmitted from the user terminal 16 to the user position management server 12 in the processing of uploading position coordinates and others in the ID disclosing mode (including position coordinates and others that are associated with the "private" flag). This way, the ranking generating section 88 can generate more detailed ranking than the one that is generated only from position coordinates and others that are transmitted from the user terminal 16 to the user position management server 12 in the anonymous mode.

To give another example, the user may set the size and shape of a privacy area. Data indicating the range of a privacy area is also not limited to privacy area center point data. For instance, the settings information storing section 63 may store privacy area center point data in association with information that indicates the size and shape of the privacy area.

In the description given above, the area-based user ID storage portion 84 accumulates the user IDs of users who have obtained position coordinates inside areas identified by their respective area IDs through positioning within a given period of time (for example, one week) and uploaded the position coordinates to the user position management server 12. When the user terminal 16 transmits position coordinates to the user position management server 12, the nearby user distributing section 94 identifies the area ID of an area that contains the received position coordinates and returns a user ID and a position coordinate set that are stored in the area-based user ID storing sectionarea-based user ID storing section 84 in association with the identified area ID. The user terminal 16 uses the returned information to generate the radar image and display a message in the travel route image. In short, in the example described above, information about the user terminals 16 that have calculated positions in the same area by positioning within a given period of time (for example, one week) is provided from the user position management server 12.

In a modification example, on the other hand, the nearby user distributing section 94 returns a calculating date/time in addition to a user ID and a position coordinate set that are stored in association with the identified area ID. In other words, the nearby user distributing section 94 returns a user ID, a position coordination set, and a calculating date/time in combination. The user terminal 16 reads a calculating date/time of each position coordinate set out of the position coordinate storing section 62 to select a calculating date/time returned from the nearby user distributing section 94 that differs from one of the read calculating dates/times by a given length of time or less, and displays information related to a returned combination that includes this calculating date/time. For instance, the user terminal 16 receives from the information server 14 information (e.g., latest information) about a user who is identified by the user ID included in the selected combination to display the information, and displays the avatar image 48 that represents this user ID in the radar image. Alternatively, if the user ID included in the selected combination is a friend user ID stored in advance, the user terminal 16 may display a message such as "found the footprints of your friend." This enables the user terminal 16 to display on the touch screen 16*a* information about other user terminals 16 that have performed positioning inside the same area within a given length of time from the time of its own positioning. The user terminal 16 may also calculate the difference between a stored calculating date/time and a returned calculating date/time and the difference between a stored position coordinate set and a returned position coordinate set to select a returned combination whose calculating date/time differs from a stored calculating date/time by a given length of time or less and whose position coordinate set differs from a stored position coordinate set by a given distance or less, and to display information about the selected combination. This way, the user terminal 16 can display on the touch screen 16*a* information about other user terminals 16 that are deduced to have been close in time and space both.

In another modification example, when the user terminal 16 transmits a set of position coordinates to the user position management server 12, the nearby user distributing section 94 identifies the area ID of an area that contains the received position coordinates and reads a combination of a user ID and a position coordinate set that is stored in the area-based user ID storing sectionarea-based user ID storing section 84 in association with the identified area ID. The nearby user distributing section 94 selects a read combination whose position coordinate set differs from the position coordinate set transmitted from the user terminal 16 by a given distance or less. The nearby user distributing section 94 returns the selected combination to the user terminal 16. Based on the returned information, the user terminal 16 generates the radar image and displays a message on the travel route image. This way, the user terminal 16 can display on the touch screen 16*a* only information about other user terminals 16 that have performed positioning within a given distance from itself.

In still another modification example, the user terminal 16 transmits a set of position coordinates and its calculating date/time to the user position management server 12. The nearby user distributing section 94 identifies the area ID of an area that contains the received position coordinates, and reads a combination of a user ID, a position coordinate set, and a calculating date/time that is stored in the area-based user ID storing sectionarea-based user ID storing section 84 in association with the identified area ID. The nearby user distributing section 94 selects a read combination whose calculating date/time differs from the calculating date/time transmitted from the user terminal 16 by a given length of time or less, and returns the selected combination to the user terminal 16. Alternatively, the nearby user distributing section 94 selects a combination whose calculating date/time differs from the received calculating time by a given length of time or less and whose position coordinate set differs from the received position coordinate set by a given distance or less, and returns the selected combination to the user terminal 16. Based on the returned information, the user terminal 16 generates the radar image and displays a message on the travel route image. This way, the user terminal 16 can display on the touch screen 16*a* information about other user terminals 16 that are deduced to have been close in time and space both.

In yet still another modification example, the area-based user ID storing sectionarea-based user ID storing section 84 stores, for each combination of an area ID and its associated time slot, a user ID, a position coordinate set, and a calculating date/time that are associated with the user terminal 16 that has calculated, by positioning, a position inside an area identified by the area ID at a date/time within the time slot. The user terminal 16 transmits a set of position coordinates and its calculating date/time to the user position management server 12. The nearby user distributing section 94 identifies the area ID of an area that contains the received position coordinates, and identifies a time slot that contains the received calculating date/time. The nearby user distributing section 94 returns a combination of a user ID, a position coordinate set, and a calculating date/time that is stored in the area-based user ID storing sectionarea-based user ID storing section 84 in association with the identified area ID and the identified time slot. Based on the returned information, the user terminal 16 generates the radar image and displays a message on the travel route image. This way, the user terminal 16 can display on the touch screen 16a information about other user terminals 16 that are deduced to have been close in time and space both.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A communication system, comprising:
a positioning unit that sequentially calculates positions of a source user terminal and sequentially storing the calculated positions in a position storing unit of the source user terminal;
a display control unit that displays a map on a display of the source user terminal, the map including an image indicating a privacy area set by a user of the source user terminal, and images which indicate candidate positions of the source user terminal, at least some of which were previously stored in, and obtained from, the position storing unit, wherein a display mode in which any of the images indicating candidate positions inside the privacy area are displayed is different from a display mode in which any of the images indicating candidate positions outside the privacy area are displayed; and
a transmission unit that transmits only the candidate positions of the source user terminal that are outside the privacy area to a server,
wherein information about the source user terminal is provided to a receiving user terminal in accordance with a control based on a given one of the candidate positions of the source user terminal that was transmitted to the server and a relative position of the receiving user terminal to such given one of the candidate positions of the source user terminal.

2. The communication system according to claim 1, further comprising:
a position obtaining unit that obtains a position from the source user terminal and a position from the recipient user terminal; and
an information providing unit that provides position information about the source user terminal,
wherein the position obtaining unit does not obtain, from the source user terminal, as a position used in the control, a position within a given distance from a position that is set by the user of the source user terminal.

3. A communication method, comprising:
sequentially calculating positions of a source user terminal and sequentially storing the calculated positions in a position storing unit of the source user terminal;
displaying a map on a display of the source user terminal, the map including an image indicating a privacy area set by a user of the source user terminal, and images which indicate candidate positions of the source user terminal, at least some of which were previously stored in, and obtained from, the position storing unit, wherein a display mode in which any of the images indicating candidate positions inside the privacy area are displayed is different from a display mode in which any of the images indicating candidate positions outside the privacy area are displayed; and
transmitting only the candidate positions of the source user terminal that are outside the privacy area to a server,
providing information about the source user terminal to a receiving user terminal in accordance with a control based on a given one of the candidate positions of the source user terminal that was transmitted to the server and a relative position of the receiving user terminal to such given one of the candidate positions of the source user terminal.

4. A program stored on a non-transitory computer-readable information storage medium having instructions for execution by a computer, the program having instructions for:
sequentially calculating positions of a source user terminal and sequentially storing the calculated positions in a position storing unit of the source user terminal;
displaying a map on a display of the source user terminal, the map including an image indicating a privacy area set by a user of the source user terminal, and images which indicate candidate positions of the source user terminal, at least some of which were previously stored in, and obtained from, the position storing unit, wherein a display mode in which any of the images indicating candidate positions inside the privacy area are displayed is different from a display mode in which any of the images indicating candidate positions outside the privacy area are displayed; and
transmitting only the candidate positions of the source user terminal that are outside the privacy area to a server,
providing information about the source user terminal to a receiving user terminal in accordance with a control based on a given one of the candidate positions of the source user terminal that was transmitted to the server and a relative position of the receiving user terminal to such given one of the candidate positions of the source user terminal.

5. A non-transitory computer-readable information storage medium having a program executed by a computer stored thereon, the program having instructions for:
sequentially calculating positions of a source user terminal and sequentially storing the calculated positions in a position storing unit of the source user terminal;
displaying a map on a display of the source user terminal, the map including an image indicating a privacy area set by a user of the source user terminal, and images which indicate candidate positions of the source user terminal, at least some of which were previously stored in, and obtained from, the position storing unit, wherein a display mode in which any of the images indicating candidate positions inside the privacy area are displayed is different from a display mode in which any of the images indicating candidate positions outside the privacy area are displayed; and
transmitting only the candidate positions of the source user terminal that are outside the privacy area to a server,
providing information about the source user terminal to a receiving user terminal in accordance with a control based on a given one of the candidate positions of the source user terminal that was transmitted to the server and a relative position of the receiving user terminal to such given one of the candidate positions of the source user terminal.

* * * * *